United States Patent
Hayzen

(10) Patent No.: US 11,287,310 B2
(45) Date of Patent: Mar. 29, 2022

(54) WAVEFORM GAP FILLING

(71) Applicant: Computational Systems, Inc., Knoxville, TN (US)

(72) Inventor: Anthony J. Hayzen, Knoxville, TN (US)

(73) Assignee: Computational Systems, Inc., Knoxville, TN (US)

(*) Notice: Subject to any disclaimer, the term of this patent is extended or adjusted under 35 U.S.C. 154(b) by 227 days.

(21) Appl. No.: 16/391,386

(22) Filed: Apr. 23, 2019

(65) Prior Publication Data

US 2020/0340853 A1 Oct. 29, 2020

(51) Int. Cl.
*G01H 1/00* (2006.01)
*G05B 23/02* (2006.01)

(52) U.S. Cl.
CPC ........... *G01H 1/006* (2013.01); *G05B 23/024* (2013.01); *G05B 23/0221* (2013.01); *G05B 2219/37435* (2013.01)

(58) Field of Classification Search
CPC .. G01H 1/006; G05B 23/0221; G05B 23/024; G05B 2219/37435
See application file for complete search history.

(56) References Cited

U.S. PATENT DOCUMENTS

| | | |
|---|---|---|
| 5,577,159 A | 11/1996 | Shoham |
| 5,903,866 A | 5/1999 | Shoham |
| 5,924,061 A | 7/1999 | Shoham |
| 5,991,725 A | 11/1999 | Asghar et al. |

(Continued)

FOREIGN PATENT DOCUMENTS

| | | | | |
|---|---|---|---|---|
| CN | 103597417 A | * | 2/2014 | ............... B64F 5/60 |
| CN | 104483016 A | * | 4/2015 | |

(Continued)

*Primary Examiner* — Stephanie E Bloss
(74) *Attorney, Agent, or Firm* — Luedeka Neely Group, P.C.; Rick Barnes

(57) ABSTRACT

A method for filling a gap of missing vibration data in a set of vibration data. At least one reference waveform on a first side of the gap is selected and at least one adjacent waveform on an opposing second side of the gap is selected. It is determined whether the gap is in a section of the vibration data where a frequency of the vibration data is one of increasing, decreasing, and steady state. Where the gap is in a section of the vibration data where the frequency of the vibration data is changing substantially linearly, an analytical method is applied to at least one of the at least one reference waveform and the at least one adjacent waveform to approximate the vibration data that is missing in the gap. Where the gap is in a section of the vibration data where the frequency of the vibration data is changing substantially exponentially, a numerical method is applied to at least one of the at least one reference waveform and the at least one adjacent waveform to approximate the vibration data that is missing in the gap. Where the gap is in a section of the vibration data where the frequency of the vibration data is substantially steady state, at least one of the at least one reference waveform and the at least one adjacent waveform is copied to approximate the vibration data that is missing in the gap. The approximated vibration data is presented to a user.

13 Claims, 19 Drawing Sheets

(56) References Cited

U.S. PATENT DOCUMENTS

| | | |
|---|---|---|
| 8,206,302 B2 | 6/2012 | Zhang et al. |
| 8,824,544 B2 | 9/2014 | Nguyen et al. |
| 2004/0153314 A1 | 8/2004 | Sato |
| 2004/0243310 A1* | 12/2004 | Griffin .................. G01H 1/006 |
| | | 702/10 |
| 2006/0206318 A1 | 9/2006 | Kapoor et al. |
| 2007/0032966 A1* | 2/2007 | Song ................. G05B 23/0243 |
| | | 702/35 |
| 2008/0208429 A1* | 8/2008 | Saravanapriyan ...... F01K 13/02 |
| | | 701/100 |
| 2009/0326950 A1 | 12/2009 | Matsumoto |
| 2011/0098968 A1* | 4/2011 | Srinivasa ............... G01H 1/003 |
| | | 702/145 |
| 2016/0026172 A1* | 1/2016 | Steele ..................... G01M 7/00 |
| | | 700/175 |
| 2017/0011560 A1* | 1/2017 | Sheldon ................... G07C 5/00 |
| 2019/0121350 A1* | 4/2019 | Cella ....................... H04L 67/12 |

FOREIGN PATENT DOCUMENTS

| | | | |
|---|---|---|---|
| EP | 865029 B1 | 7/1999 | |
| EP | 722162 B1 | 12/2001 | |
| ES | 2397084 T3 * | 3/2013 | ............. G01H 1/006 |

\* cited by examiner

226c

WAVEFORM GAP FILLING

FIELD

This invention relates to the field of data analysis. More particularly, this invention relates to creating estimated waveforms that can be used to fill in gaps of missing data in vibration data sets.

INTRODUCTION

Machine vibration information, such as might be gathered on rotating machines like a turbine, can be very useful when monitoring the health of the machine. For example, many machine problems can be diagnosed from an analysis of the vibration information. This information is typically represented as a sinusoidal waveform, with a frequency and amplitude that increase as the rotational speed of the machine increases.

Because such machines generally rotate at a relatively high speed, a large amount of data must typically be gathered to adequately represent the vibrational characteristics of the machine, and to capture the information that would be required to diagnose any issues with the machine. Because of the large amount of data, it is problematic to both transmit the data and to store the data. Transmission problems arise because of the bandwidth that would be required by the large amount of data, and storage problems arise because of the amount of storage space that would be required by the large amount of data.

In order to reduce such problems, some vibration instruments only pass along a subset of the vibration data. This can be accomplished in one or more of a variety of different ways, for example, by either not sensing a portion of the data or by not passing along a portion of the data that is sensed. This tends to reduce the bandwidth and storage requirements.

However, it can be disconcerting to see such gaps in the data when it comes time to analyze or otherwise review the data.

What is needed therefore, is a system for reducing issues such as those described above, at least in part.

SUMMARY

The above and other needs are met by a method for filling a gap of missing vibration data in a set of vibration data. At least one reference waveform on a first side of the gap is selected and at least one adjacent waveform on an opposing second side of the gap is selected. It is determined whether the gap is in a section of the vibration data where a frequency of the vibration data is one of increasing, decreasing, and steady state. Where the gap is in a section of the vibration data where the frequency of the vibration data is changing substantially linearly, an analytical method is applied to at least one of the at least one reference waveform and the at least one adjacent waveform to approximate the vibration data that is missing in the gap. Where the gap is in a section of the vibration data where the frequency of the vibration data is changing substantially exponentially, a numerical method is applied to at least one of the at least one reference waveform and the at least one adjacent waveform to approximate the vibration data that is missing in the gap. Where the gap is in a section of the vibration data where the frequency of the vibration data is substantially steady state, at least one of the at least one reference waveform and the at least one adjacent waveform is copied to approximate the vibration data that is missing in the gap. The approximated vibration data is presented to a user.

In some embodiments according to this aspect of the invention, when the gap is in a section of the vibration data where the frequency of the vibration data is substantially changing, the at least one reference waveform has a frequency that is slower than the at least one adjacent waveform. In some embodiments, the step of presenting the approximated vibration data includes displaying a plot of the set of vibration data to the user with the gap filled.

In some embodiments, the set of vibration data is sensed from a rotating machine. In some embodiments, the set of vibration data is sensed from a turbine. In some embodiments, the frequency of the vibration data is changing substantially linearly as a rotating speed of the turbine is increased to an operating speed. In some embodiments, the frequency of the vibration data is changing substantially exponentially as a rotating speed of the turbine is decreased from an operating speed. In some embodiments, the frequency of the vibration data is substantially steady state as the turbine is running at an operating speed.

In some embodiments, the step of approximating the data when using either the numerical method or the analytical method includes the steps of approximating a frequency rate of change of the missing vibration data in the gap, approximating tach signal locations of the missing vibration data in the gap, approximating an amplitude rate of change of the missing vibration data in the gap, and approximating a phase rate of change of the missing vibration data in the gap. Then, the gap is filled with ideal waveforms between the tach signal locations, and the ideal waveforms are adjusted using the approximated frequency, amplitude, and phase rates of change.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
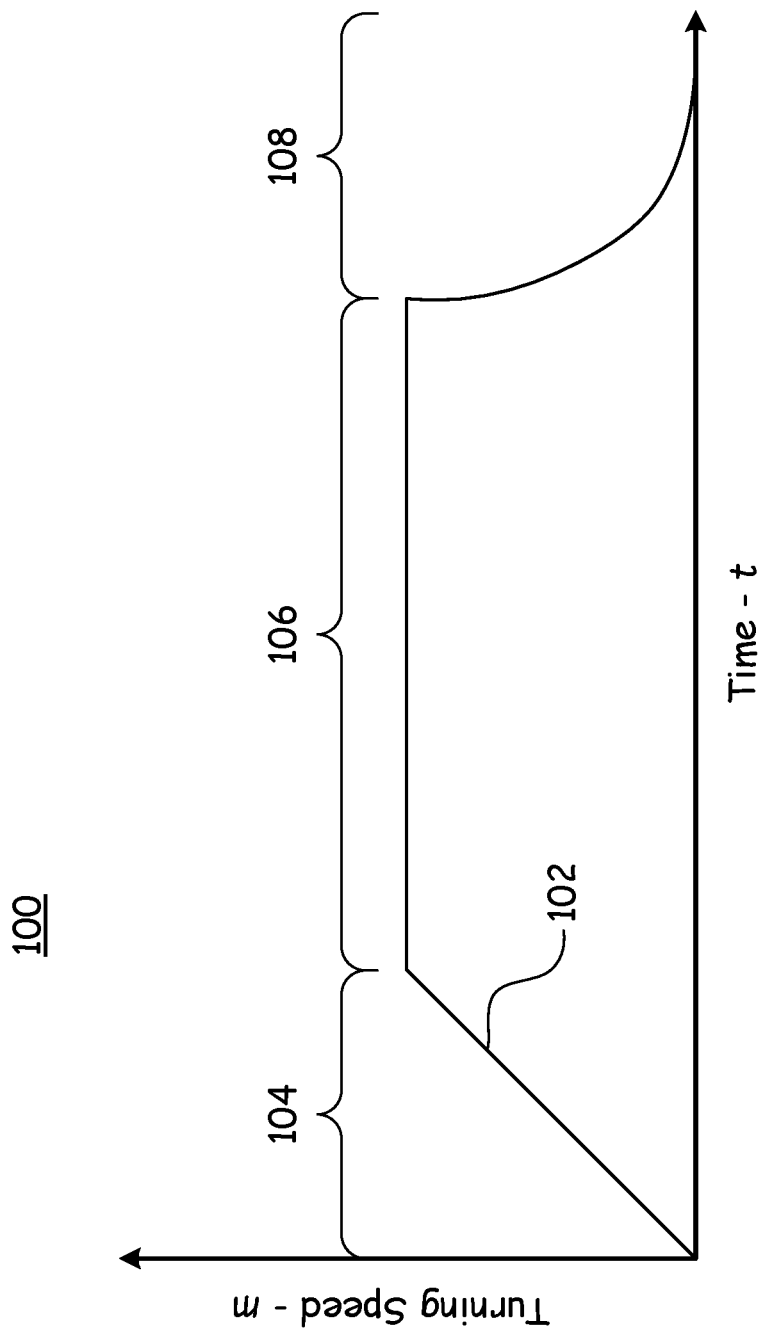
FIG. 1 is a graph of turning speed versus time for a rotating machine, showing a first section of linear speed increase when the machine is turned on, a second section of steady state speed during operation of the machine, and a third section of exponential speed decay when the machine is turned off.

With reference now to FIG. 1, there is depicted a representational graph 100 of turning speed versus time for a rotating machine, with a waveform 102. As depicted, there is a first section 104 of linear speed increase when the machine is turned on, a second section 106 of steady state speed during operation of the machine, and a third section 108 of exponential speed decay when the machine is turned off.

Although not indicated on the graph, the relative lengths of time for these three sections 104, 106, and 108 might not be as depicted. For example, it might take several hours for the machine to be ramped up to its operating speed, as represented by section 104, and then it might remain at the operating speed for weeks or months, as represented by section 106. Finally, it might take only a matter of minutes or a couple of hours for the machine to stop rotating once it is turned off, as represented by section 108.

Figure 17A:
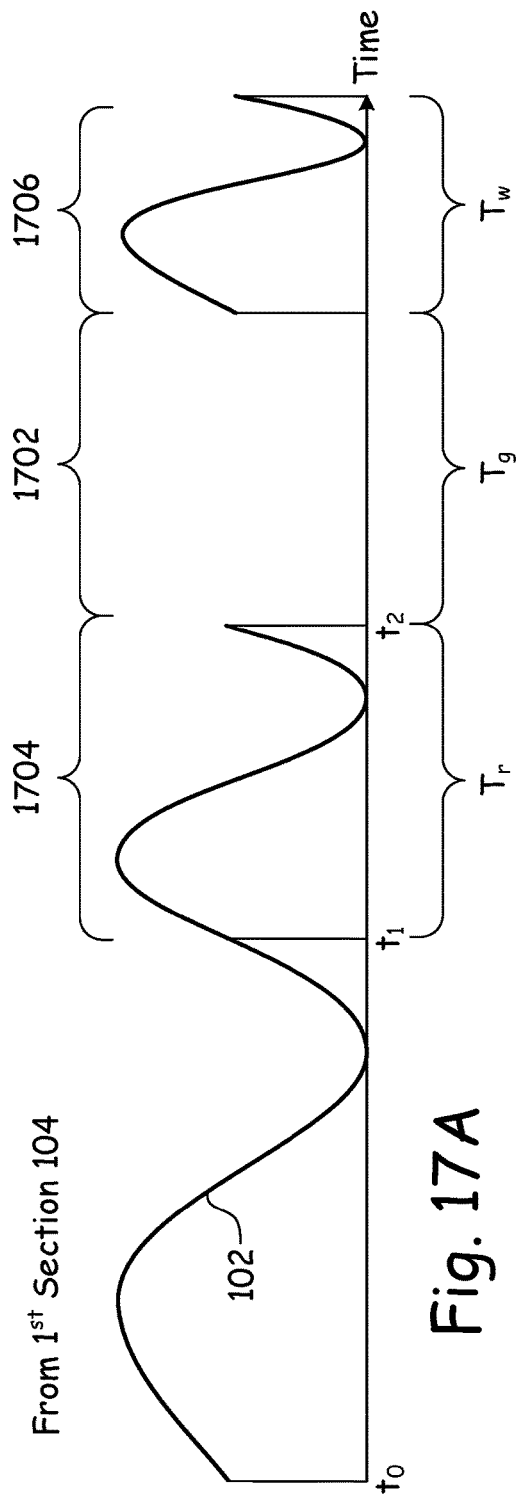
FIG. 17A depicts a first representation of a reference waveform, gap, and adjacent waveform.
Figure 17B:
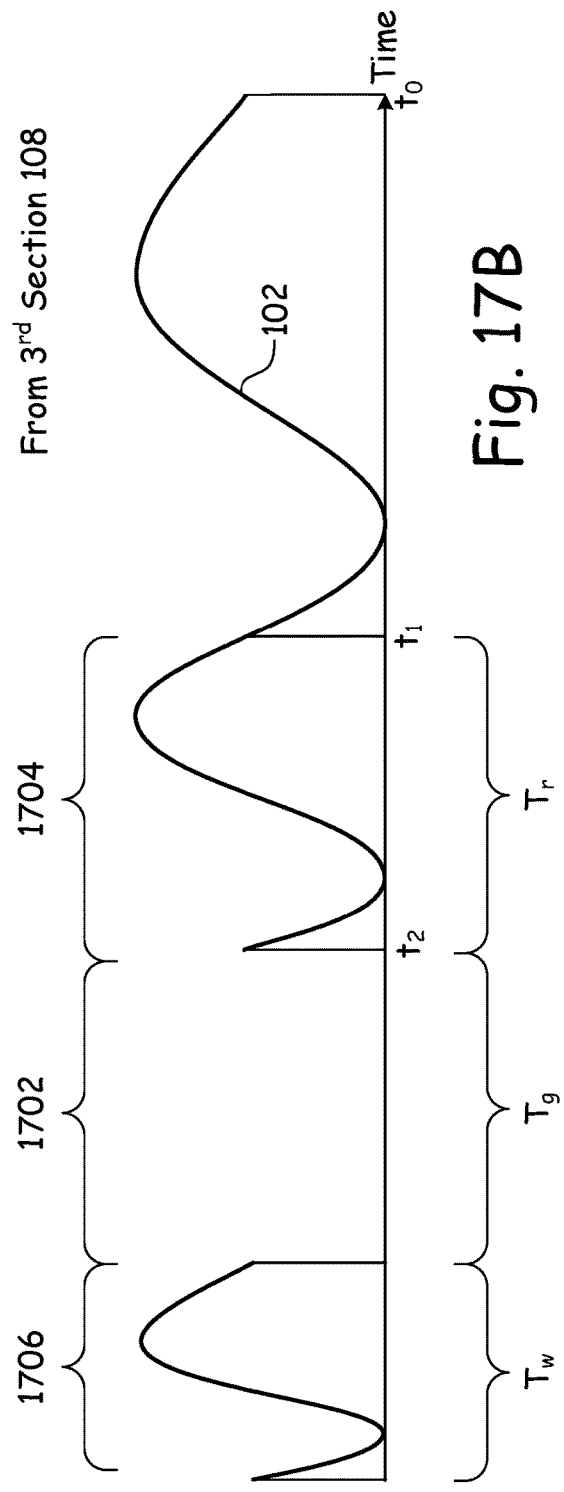
FIG. 17B depicts a second representation of a reference waveform, gap, and adjacent waveform.

As depicted in FIGS. 17A and 17B, the waveform data provided has gaps 1702 in it, so as to reduce transmission, storage, and other issues associated with the amount of data that is produced. Instead of recording, transmitting, and storing actual vibration data for these gaps 1702, some embodiments of the present invention fill any such gaps 1702 with estimates of the waveform 102 data. These estimates are produced by analyzing the waveform 102 data this is provided on either side of the gap 1702 that is to be filled.

In the second section 106 of the graph 100, re-creation of waveforms 102 in the gaps 1702 is a relatively straightforward procedure. Because the machine is operating at steady state, each waveform 102 in section 106 looks substantially like any other waveform 102 in section 106, and so the waveform gaps 1702 in the second section 106 can be filled in with waveforms 102 that are either identical to those waveforms 102 that precede or follow the gap 1702, or are simple linear interpolations of such.

It is appreciated that any anomaly that might have occurred during such a gap 1702 cannot be recreated, regardless of the section 104, 106, or 108 in which it may have occurred, as the data to do so is probably not present in the waveform 102 data preceding or following the gap 1702 in which the anomaly occurred. Thus, the waveforms 102 produced according to the present embodiments would tend to not be useful for investigation of any such. Instead, they tend to provide a continuous representation of data that might be useful in certain circumstances.

Estimations of the waveforms 102 to fill the gaps 1702 in the first section 104 and the third section 108, however, are not as straightforward as the estimation of the waveforms 102 to fill the gaps 1702 in the second section 106, because of the change in turning speed in those sections 104 and 108.

While it might seem that a simple interpolation between preceding and following waveforms 102 could be performed to produce waveforms 102 for the gaps 1702 in the first section 104 that represents a linear increase in speed, such a method is inadequate because the speed does not increase just between successive rotations in a stepped manner. Instead, the speed increases continually throughout a given rotation, and therefore the waveform 102 produced during a given rotation changes throughout its period.

This problem is compounded further for the waveforms 102 that are produced during the third section 108, because the speed of the machine is decreasing substantially exponentially instead of substantially linearly.

Thus, according to the embodiments described below, a quadratic analytical solution is described in regard to estimating missing waveforms 102 in the gaps 1702 in the first section 104, and an iterative numerical solution is described in regard to estimating missing waveforms 102 in the gaps 1702 in the third section 108.

Figure 2:
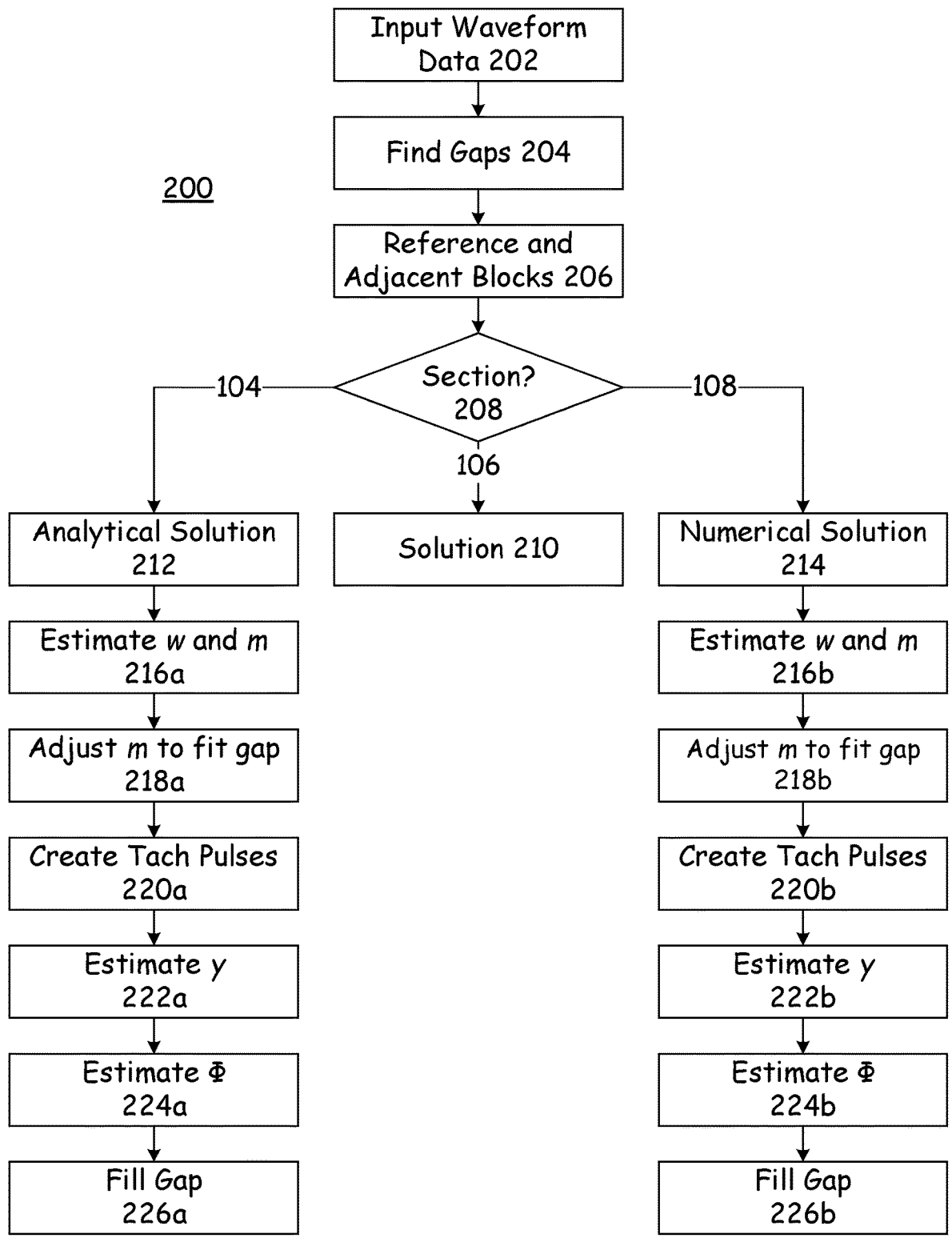
FIG. 2 is a flowchart for the overall method for estimating missing waveforms, according to an embodiment of the present invention.
Figure 3:
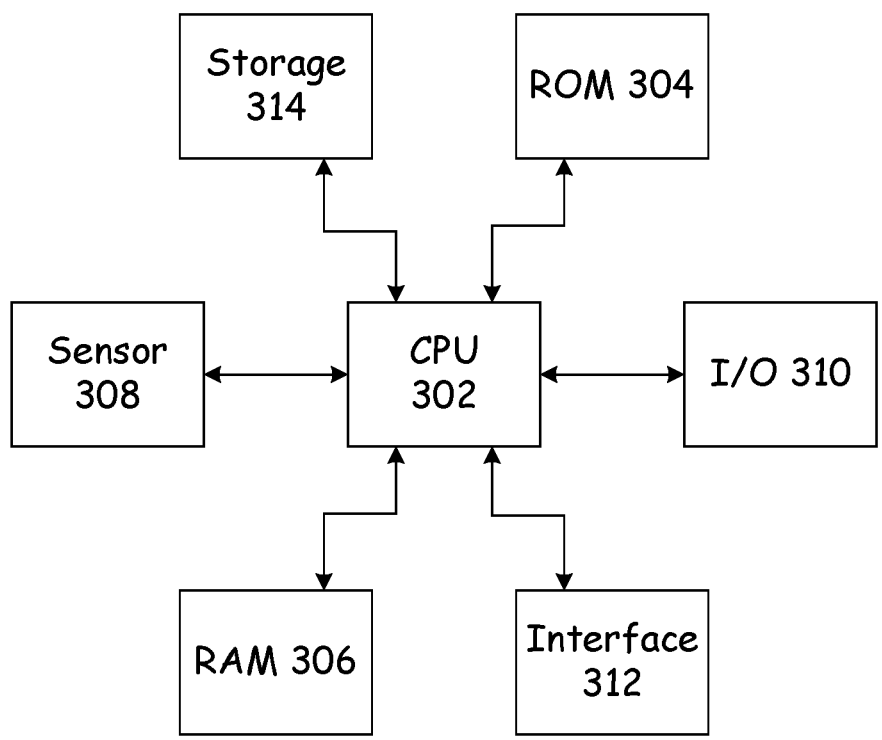
FIG. 3 is a functional block diagram of an apparatus for estimating waveforms, according to an embodiment of the present invention.

In each case, both the analytical solution for the linear first section 104 and the numerical solution for the exponential third section 108, a common basic approach 200 is used, as depicted in FIG. 2. As can be seen, the waveform 102 data, with gaps 1702, is input into a computational apparatus (such as depicted in FIG. 3) as given in block 202. A gap 1702 in the data is identified, as given in block 204, and the two waveforms 1704 and 1706 on either side of the gap 1702 are selected for further processing, as given in block 206.

It is then determined what section of the graph 100 the two selected waveforms belong to—be it the first section 104, the second section 106, or the third section 108, as given in block 208 of the flowchart 200.

In some embodiments, the waveform 102 next to the gap 1702 that has the slower turning speed is designated the reference waveform 1704, as depicted in FIGS. 17A and 17B, and the waveform 102 adjacent the gap 1702 that has the higher turning speed is designated the adjacent waveform 1706. In the first section 104, the reference waveform 1704 is the waveform 102 preceding the gap 1702 in time and the adjacent waveform 1706 is the waveform 102 following the gap 1702 in time, as depicted in FIG. 17A. In the third section 108, the reference waveform 1704 is the waveform 102 following the gap 1702 in time and the adjacent waveform 1706 is the waveform 102 preceding the gap 1702 in time, as depicted in FIG. 17B.

The reason for doing this is that there are more data points per unit of time in a waveform 102 that has a slower turning speed, and thus the accuracy of the computations described herein can be improved by making the designation as described in the paragraph above. However, in other embodiments, some other method besides just turning speed is used to determine which waveform 102 is designated as the reference waveform 1704 and the adjacent waveform 1706.

It is appreciated that the waveforms 1704 and 1706 and the gap 1702 are not meant to imply any kind of exact relative time scale. In general, the reference waveform 1704 will have a longer period $T_r$ than the period $T_w$ of the adjacent waveform 1706. The gap 1702 with a duration of $T_g$ might have one or many missing waveforms 102 that are to be estimated.

If both the reference waveform 1704 and the adjacent waveform 1706 are from the second section 106, then the method falls to block 210, where a copy or simple linear interpolation is performed to produce the missing waveforms 102 and fill in the gap 1702. If both the reference 1704 and adjacent 1706 waveforms are from the first section 104, then the method falls to block 212, where an analytical quadratic estimation is performed to produce the missing waveforms 102 and fill in the gap 1702. Finally, If the reference waveform 1704 and adjacent waveform 1706 are from the third section 108, then the method falls to block 214, where an iterative numerical estimation is performed to produce the missing waveforms 102 and fill in the gap 1702.

The goals of the individual steps for both the analytical solution 212 and the iterative numerical solution 214 are generally the same, and so are depicted in FIG. 2 with common names. However, the manner in which these steps are performed in the analytical solution 212 are different from the manner in which the steps are performed in the iterative numerical solution 214, as described in more detail hereafter. Therefore, the reference numbers used for each step are the same for each method 212 and 214, but are distinguished one from another with the label "a" for the steps of the analytical solution 212, and "b" for the steps of the numerical solution 214.

The general steps for both the analytical solution 212 and the iterative numerical solution 214 proceed as follows. The frequency and speed rate of change of the missing waveforms 102 in the gap 1702 are estimated, as given in methods 216a and 216b, and the rate of speed change in the gap 1702 is adjusted, as given in methods 218a and 218b. Tachometer pulses are created and placed in proper positions in the gap 1702, as given in methods 220a and 220b. The change in rate of the amplitude is estimated, as given in methods 222a and 222b, and the rate of change of the phase is estimated, as given in methods 224a and 224b. The gap 1702 is filled with an estimated waveform 102 that has been adjusted for rotational speed, amplitude, and phase changes, as given in methods 226a and 226b.

It is again mentioned that, even though these steps have similar names in each of the analytical solution 212 and the iterative numerical solution 214, they are performed in different ways, as described in more detail below.

With reference now to FIG. 3, there is depicted an instrument 300 for filling waveforms 102 into a gap 1702. In one embodiment, the instrument 300 is a computer that receives the waveform 102 data through the input/output 310, or otherwise as described herein. In other embodiments, the instrument 300 receives all of the waveform 102 data directly from a sensor 308. In some embodiments the steps of the methods as described herein are embodied in a computer language on a non-transitory storage medium 314 that is readable by the instrument 300 of FIG. 3, and which enable the instrument 300 to fill the gap 1702 as described herein. In some embodiments the instrument 300 includes a read only memory 304, such as might contain basic operating instructions, and a random access memory 306, such as is used to hold data used in or for the various computations as described herein. An interface 312 is used for an operator to communicate with the instrument 300.

The various embodiments of the present invention thus improve the basic operation of an apparatus 300 as depicted. If bandwidths of the I/O 310, for example, and the storage capacity of the medium 314 could handle the extreme amounts of data that are produced by a sensor 308, then there might be no need to only transmit and store a portion of the waveform data, and thus there might also be no gaps 1702 in the waveform 102 data that need to be filled.

Conceptual Overview

The first three steps 216a-220a and 216b-220b of each method 212 and 214 have a goal of placing estimated tachometer signal pulses within the gap 1702, where two consecutive tach pulses t1 and t2 of the reference waveform 1704, as depicted in FIGS. 17A and 17B, define between them one rotation of the machine from which the data was gathered. If the tach pulses in the original data signal have been preserved for the gaps 1702, then no estimation of the tach pulse time locations is required. The tach pulse data might be preserved, for example, because it is a relatively small component of the overall data stream, and thus it does not add significantly to the overhead to retain it in the data stream. However, if the tach signal timing data has not been retained in the data stream, then it is estimated as described herein. When the rotational speed changes either linearly or exponentially as in sections 104 and 108, respectively, then the time between the tach pluses changes from tach pulse to tach pulse.

Figure 4:
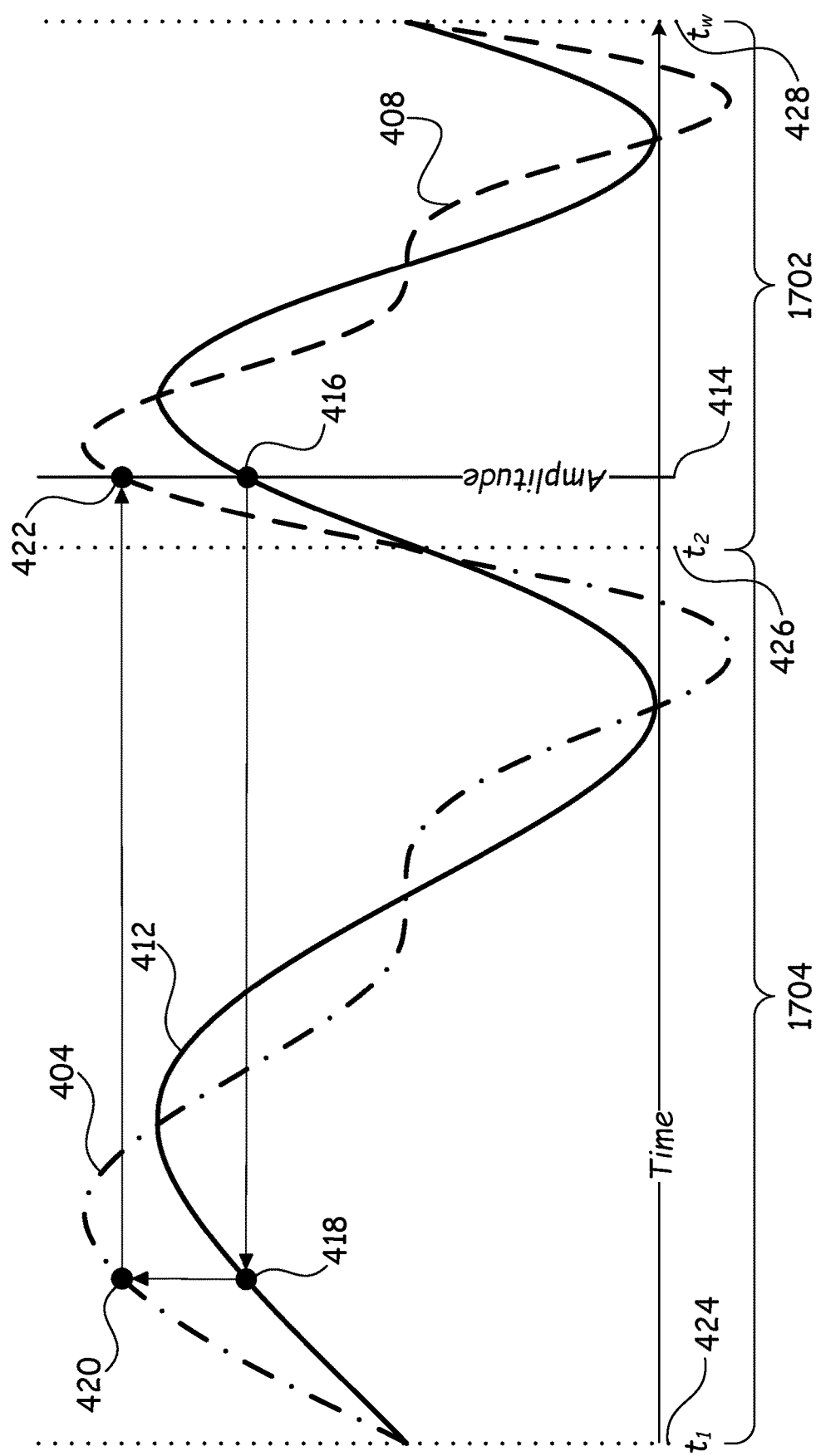
FIG. 4 is a diagrammatic representation of the basic method for estimating missing waveforms, according to an embodiment of the present invention.

Once the tach pulses have been placed in the gap 1702, the rate of change of both amplitude and phase are calculated, and then estimated waveforms 102 are produced in the gap 1702. FIG. 4 diagrammatically depicts the basic method for estimating waveforms.

The waveform 404 within the reference block 1704 is defined by two consecutive tach signals $t_1$ 424 and $t_2$ 426. The waveform 404 includes the data gathered for one revolution of the machine. It is appreciated that the shape of the waveform 404 is representational, and in actual use might have a different and more complex shape.

Section 1702 is the gap 1702 to be filled. It is defined by the tach signal $t_2$ 426 at the end of the reference waveform block 1704 preceding the gap 1702, and the estimated (or actual) tach signal 428 at the start of the adjacent waveform 1706.

A pure sine wave 412 is placed within both sections 1704 and 1702. The sine wave 412 is given the same amplitude in both sections 1704 and 1702, but the frequency of the sine wave 412 is different in each section 1704 and 1702. In section 1704 the frequency of the sine wave 412 is set to exactly match one revolution between the two tach signals $t_1$ 424 and $t_2$ 426. In section 1702 the frequency of the sine wave 412 is set to exactly match one revolution between the two tach signals 426 and 428.

FIG. 4 depicts a case that is taken from the first section 104 of the chart 100 in FIG. 1, and thus speed is increasing linearly. Thus, tach signals $t_1$ 424 and $t_2$ 426 are closer to each other than are tach signals 424 and 426, and therefore the frequency of the sine wave 412 in section 1702 is higher than the frequency of the sine wave 412 in section 1704.

It is appreciated that if FIG. 4 depicted a case that was taken from the third section 108 of the chart 100 in FIG. 1, then speed would be decreasing exponentially, and tach signals $t_1$ 424 and $t_2$ 426 would be farther apart from each other than tach signals 424 and 426.

At this point, we have two sections 1704 and 1702 that are each filled with parts of a sine wave 412, where the frequency of the sine wave 412 in section 1704 is different than the frequency of the sine wave 412 in section 1702.

A position is identified at time 414 in section 1702. In some embodiments, time 414 represents the first of a predetermined number of time divisions that will be used in each waveform 408 section (between successive tach signals) to be filled in the gap 1702. In such an embodiment, a given number of time divisions will be used for each waveform 408 in the gap 1702, no matter how short the time duration between two successive tach signals. In other embodiments, time 414 represents a specific length of time. In this embodiment, shorter waveforms in the gap 1702 (smaller distance between tach signals) are estimated using fewer time data points. In other embodiments, a combination of these two embodiments or some other method is used to determine the times 414.

The amplitude 416 of the sine wave 412 is determined at time 414. This amplitude is mapped over to the corresponding time position 418 that intersects the sine wave 412 within section 1704. Then the amplitude 420 of the actual waveform 404 is determined at that time position 418. Finally, the amplitude 420 is mapped over to position 422, which position 422 has the amplitude 420 of the actual waveform from section 1704, but at the time 414 in section 1702. By repeating this four-step process for each of the desired number of time positions 414, a complete approximated waveform 408 is constructed within the gap 1702. Using this same process, additional waveforms 408 are constructed between successive tach signals within the gap 1702, until the gap 1702 is completely filled.

These waveforms 408 are corrected for amplitude, as given in step 222 of FIG. 2. As a machine changes rotational speed, the amplitude of the vibration waveform 102 typically changes in a similar way. Therefore, some embodiments of the present invention assume that if the change in rotational speed is linear, as in section 104 of graph 100, then the change in waveform amplitude is also linear, but at a different rate of change than the rotational speed rate of change. Similarly, if the change in rotational speed is exponential (as in section 108 of graph 100), then the change in waveform amplitude is assumed to be exponential.

In addition, the phase associated with the first order turning speed changes from one waveform 102 to the next as the rotational speed of the machine changes. Therefore, the waveforms 102 that fill the gap 1702 are adjusted for this change in phase. The rate of change in phase is assumed to be either linear or exponential, according to the section 104 or 108 in which the gap 1702 is identified.

The steps as generally described in this section can be accomplished using analytical methods for the case of the linear change in speed, as depicted in section 104 of FIG. 1, and are performed using numerical methods for the case of the exponential change in speed, as depicted in section 108 of FIG. 1.

Analytical Solution for Linear Portion

A. Linear Frequency and Speed

Figure 5:
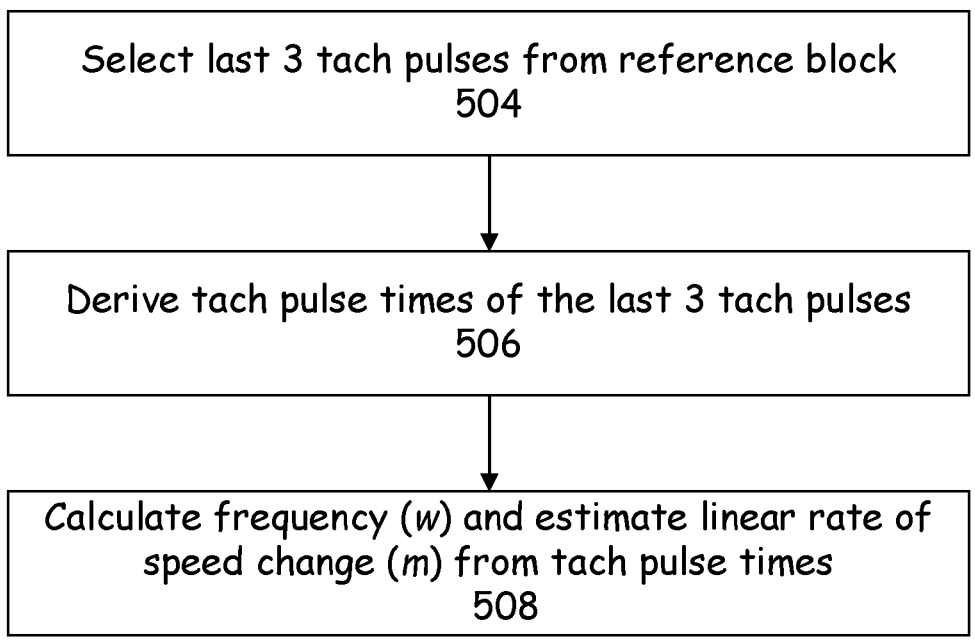
FIG. 5 is a flowchart of a first part of a detailed method for estimating waveforms for linear speed increases, according to an embodiment of the present invention.
Figure 6:
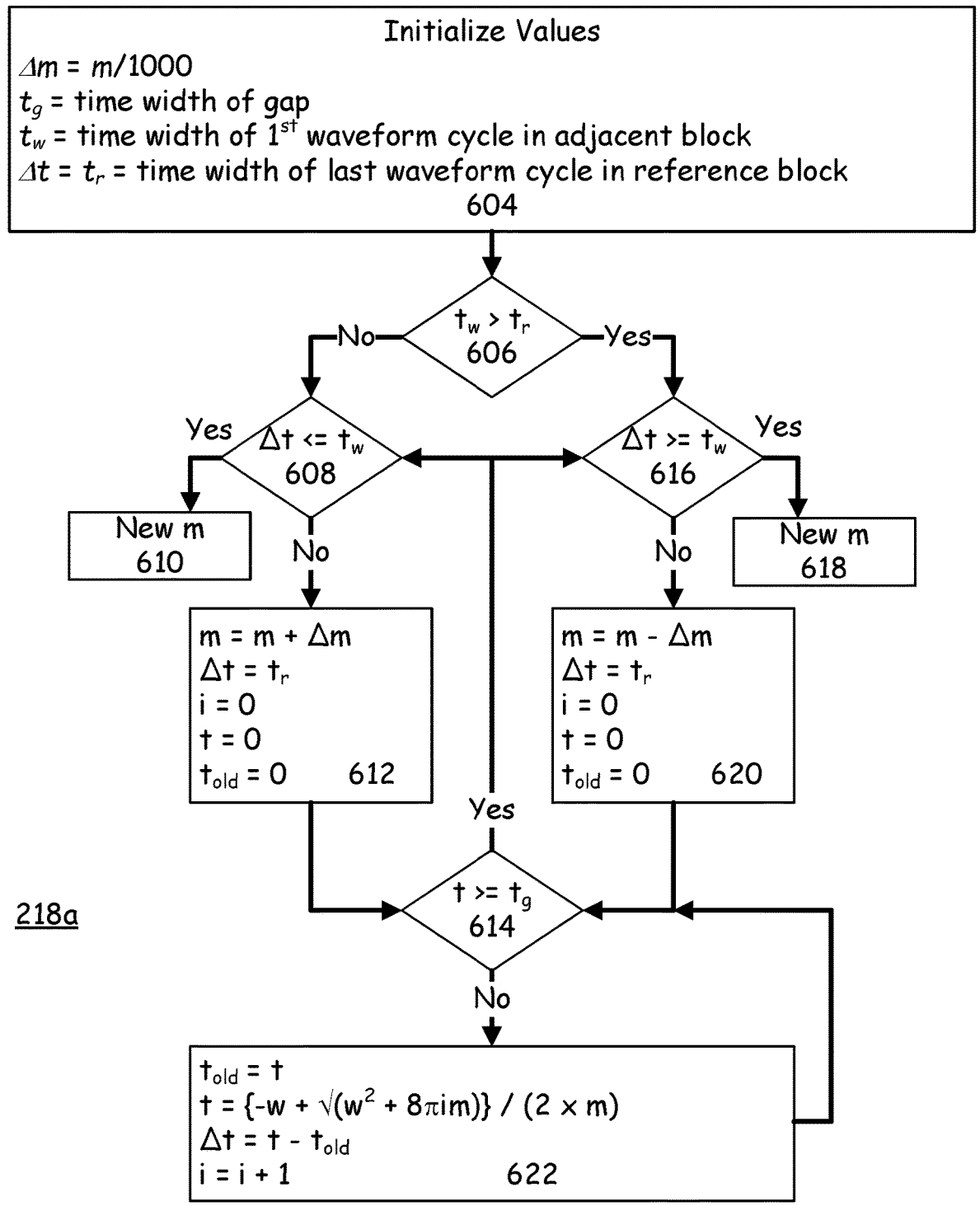
FIG. 6 is a flowchart of a second part of a detailed method for estimating waveforms for linear speed increases, according to an embodiment of the present invention.

The linear rate of change in rotational speed is initially calculated from the last two waveform cycles in the reference block 1704, according to the method 216a as depicted in FIG. 5. This is then adjusted to ensure that the tachometer pulse at the end of the gap 1702 matches up with the first tachometer pulse in the adjacent block 1706, according to the method 218a as depicted in FIG. 6.

The calculations are based on the times of the last three tach pulses $t_0$, $t_1$, and $t_2$, in reference block 1704, as depicted in FIGS. 17A and 17B. By "last" it is understood to mean the three tach pulses closest to the gap 1702. So, those three tach pulses are identified as given in block 504 of FIG. 5, and the times at which they exist are derived as given in block 506. The times are relative at this point, with the time of the tach pulse that is furthest from the gap 1702 being given a designation of $t_0=0$, and the times of the other two tach pulses preceding sequentially in a positively increasing direction from $t_1$ to $t_2$.

A linear increase in rotational speed or frequency uses the following equation, where the amplitude (y) is given by:

$$y=\sin[(mt+w)t]=\sin(mt^2+wt)$$

where m is the linear rate of change in rotational speed, w is the first order turning frequency, and t is the time.

For each complete cycle of the sine waveform 412 in FIG. 4, or in other words where $$mt_1^2+wt_1=2\pi \text{ and}$$

$$mt_2^2-wt_2=4\pi,$$

the amplitude is zero, which from above is expressed in an equation as:

$$\sin(mt^2+wt)=0.$$

Solving the two equations yields:

$$w=2\pi(1-2t_1^2/t_2^2)/t_1(1-t_1/t_2), \text{ and}$$

$$m=(4\pi-wt_2)/t_2^2.$$

The two equations above are used to calculate frequency and linear rate of speed change, as given in block 508 of FIG. 5.

The rate of change m as initially calculated in this manner may not be the same as that for the waveform in the adjacent block 1706 on the opposing side of the gap 1702, and therefore needs to be adjusted according to the method 218a as depicted in FIG. 6. The process is to iteratively adjust the rate of change in rotational speed (m) until the final tachometer pulse in the gap 1702 matches the first tachometer pulse of the waveform in the adjacent block 1706, which is at $t_w$.

Thus, the starting rotational speed rate of change m as initially estimated is either increased or decreased as necessary, depending on a comparison of the tachometer pulse widths $t_w$ and $t_r$, where $t_r$ is the tach pulse width between the two tach pulses that are closest to the gap 1702 in the reference block. The gap 1702 is then filled with tachometer pulses, where the final pulse within the gap 1702 Δt is compared to $t_w$. This process is repeated iteratively until they match.

Using the equation for a linear change in rotational speed $$y=\sin\{(mt+w)t\}=\sin(mt^2+wt).$$

The equation for the pulse times in the gap 1702 is given by $$\sin(mt^2+wt)=0, \text{ when}$$

$$mt^2+wt=2\pi_i,$$

where (i) is the $i^{th}$ tachometer pulse.

Solving this quadratic equation gives $$t_i = \{-w + \sqrt{(w^2 + 8\pi m_i)}\}/2m.$$

In regard to FIG. 6, method 218a starts in block 604 by determining and setting the variables that will be used in the method 218a. For example, the time width of the gap 1702 $t_g$ is determined, as well as the time widths of the first tach pulse $t_w$ in the adjacent block 1706 and the last tach pulse $t_r$ in the reference block 1704. A value is selected for an incremental amount $\Delta m$ by which the speed m will be iteratively adjusted so as to make the tach pulses in the gap 1702 line up with the tach pulses in the adjacent block 1706. A variable $\Delta t$ is initialized at the value of $t_r$.

The time width between the two tach pulses that are closest to the gap 1702 in the reference block 1704 and the two tach pulses that are closest to the gap 1702 in the adjacent block 1706, $t_r$ and $t_w$ respectively, are compared to see which is greater, as given in block 606. If $t_r$ is less than $t_w$, then the right-hand side of the method 218a as depicted in FIG. 6 is implemented in block 616. If $t_r$ is greater than $t_w$, then the left-hand side of the method 218a as depicted in FIG. 6 is implemented in block 608.

In blocks 608 and 616, $t_w$ is compared to $\Delta t$. In block 608, if $\Delta t$ is not greater than $t_w$, then the method 218a exits with the new speed m as previously determined. Similarly, in block 616, if $\Delta t$ is greater than or equal to $t_w$, then the method 218a exits with the new speed m as previously determined. However, if in either case the answer to the test of 608 or 616 is no, then the method falls respectively to block 612 or 620, where variables are initialized for a loop where m is adjusted until the criteria as described herein have been met. In block 612, m is too small, and so m is adjusted upwards by the value of $\Delta m$. In block 620, m is too large, and so m is adjusted downwards by the value of $\Delta m$.

The time t is then tested against the gap time $t_g$, as given in block 614. If the test fails, then a new t is calculated as indicated in block 622, and as described above. The new t is again tested against the gap time $t_g$, and when the new t eventually satisfies this condition in block 614, the method 218a returns blocks 608 and 616, where the iterations continue until the speed m is found which allows the tach signals to align.

B. Linear Tach Pulses

Once the rate of change in rotational speed m has been adjusted, the next step is to create the tachometer pulses in the gap 1702. This step enables the gap 1702 to be filled with a representative wave 412.

Using the equation for a linear change in rotational speed shown above, the time for each tachometer pulse $t_i$ is given by $$mt_i^2 + wt_i = 2\pi,$$

Solving this quadratic equation for $t_i$ gives $$t_i = \{-w + \sqrt{(w^2 + 8\pi m_i)}\}/(2 \times m)$$

Figure 7:
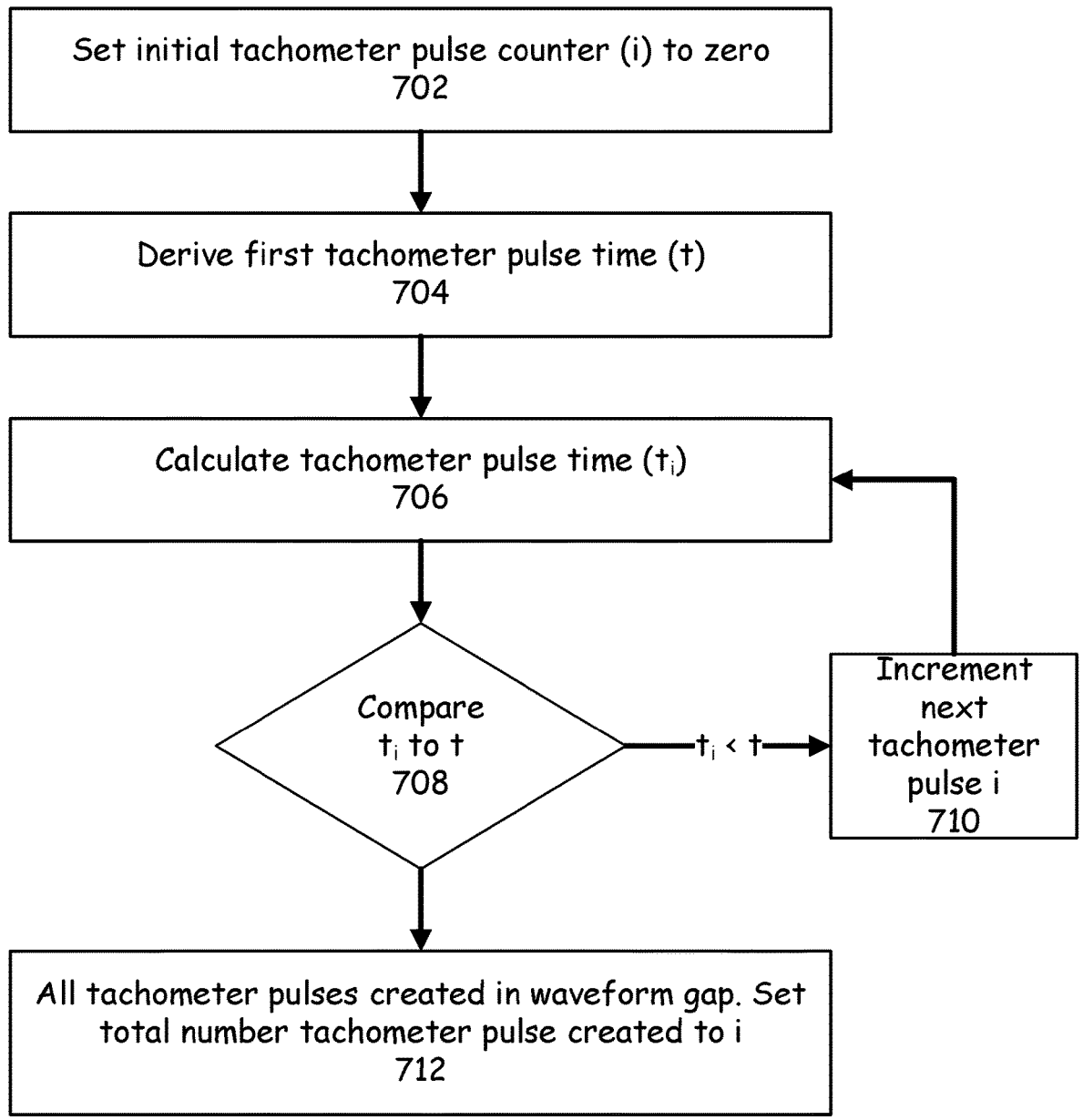
FIG. 7 is a flowchart of a third part of a detailed method for estimating waveforms for linear speed increases, according to an embodiment of the present invention.

This is depicted as method 220a in FIG. 7. The initial tach pulse counter i is set to zero, as given in block 702. The time width of the gap 1702 t is derived, as given above and in block 704, and the tachometer pulse time $t_i$ is calculated, also as given above and as indicated in block 706. The value of $t_i$ is compared to t, as given in block 708. If $t_i$ is less than t, then there is room for another tach pulse, so the tach pulse number i is incremented as given in block 710, and the process returns to block 706 to calculate the next tach pulse time $t_i$. However, if $t_i$ is not less than t, then all of the tach pulses have been created, and the method falls to block 712, and the total number of tach pulses created is the current value of i.

C. Linear Amplitude

Figure 8:
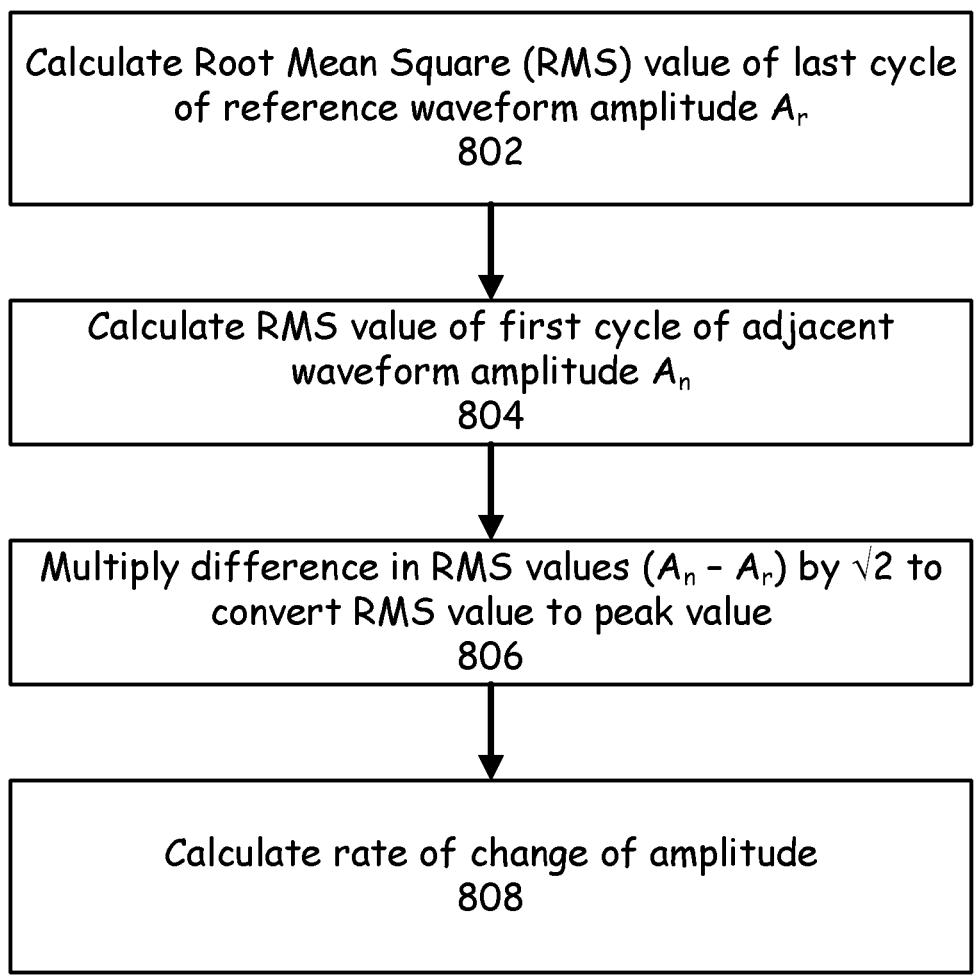
FIG. 8 is a flowchart of a fourth part of a detailed method for estimating waveforms for linear speed increases, according to an embodiment of the present invention.

Method 222a depicted in FIG. 8 illustrates the process to calculate the linear rate of change in waveform amplitude. The linear change in amplitude (y) is given by $$y = (1 + at) \times \sin\{(mt + w)t\}$$

where a is the linear rate of change in waveform amplitude and t is the time in seconds.

In FIG. 8, the RMS amplitude value ($A_r$) of the last cycle of the reference waveform 1704 is calculated, as given in block 802. The RMS value ($A_n$) of the first cycle of the adjacent waveform 1706 is also calculated, as given in block 804. The difference in the RMS amplitude values is converted to a peak value by multiplying by $\sqrt{2}$, as given in block 806. The linear rate of change in waveform amplitude (a) is calculated as given in block 808, using $$a = (A_n - A_r) \ast \sqrt{2}/T_g$$

where $T_g$ is the time between the waveforms, or in other words, the gap 1702 time.

D. Linear Phase

Figure 9:
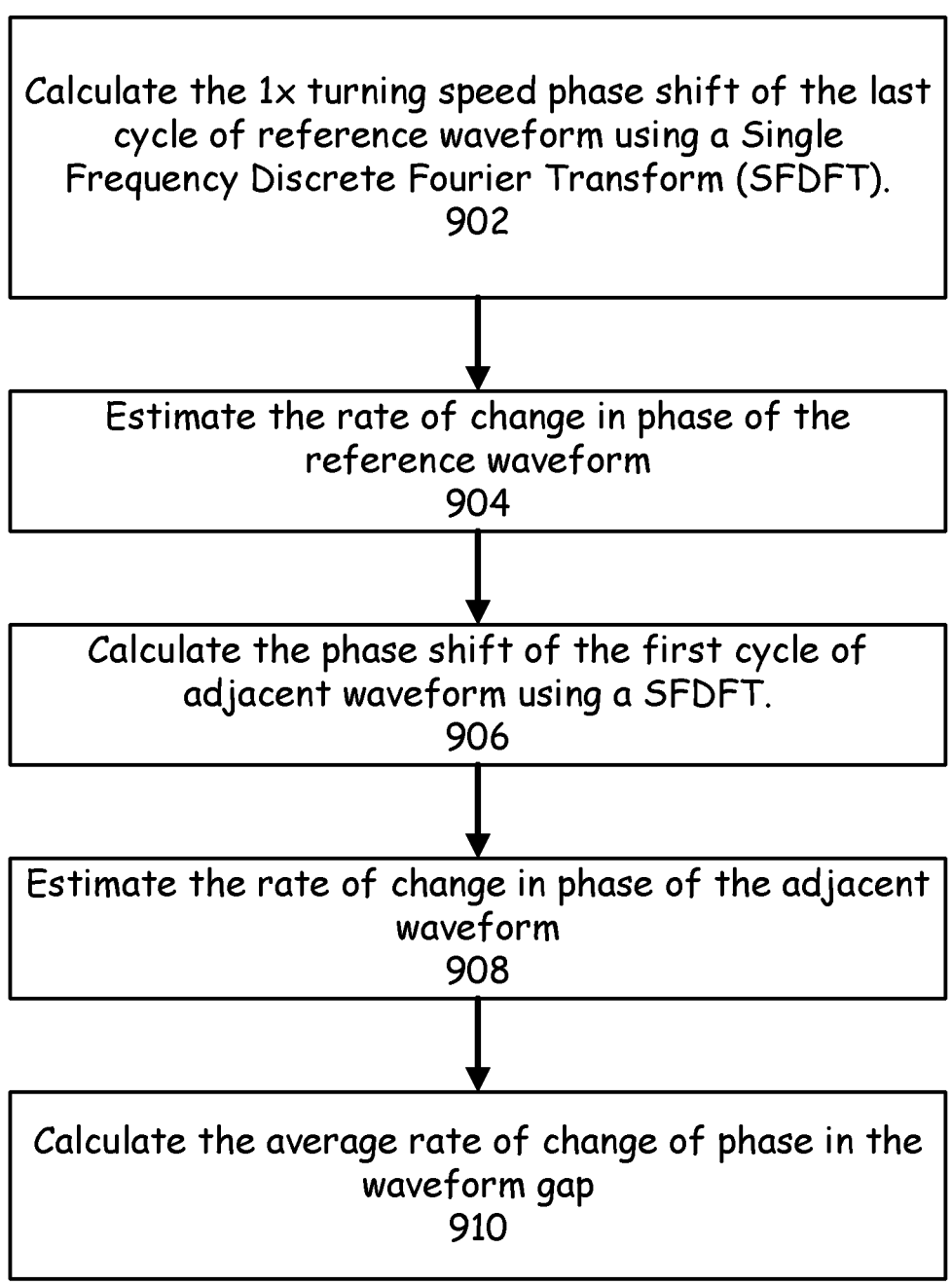
FIG. 9 is a flowchart of a fifth part of a detailed method for estimating waveforms for linear speed increases, according to an embodiment of the present invention.

The linear change in phase $\Delta\phi$ is given by $$y = \sin\{(mt + w)t + \Delta\phi t\}$$

where $\Delta\phi$ is the linear rate of change in waveform phase, and t is the time in seconds. Method 224a to accomplish this is depicted in FIG. 9. The change in phase $\phi_r$ of the last cycle of the reference waveform 1704 is calculated using a Single Frequency Discrete Fourier Transform (SFDFT), as given in block 902. The waveform samples are taken between the last two tachometer pulses in the reference waveform 1704, as explained above.

The rate of change in phase is then estimated using $$\Delta\phi_r = \phi_r/t_r$$

as given in block 904, where $t_r$ is the time between the two tachometer pulses. The change in phase $\phi_w$ of the first cycle of the adjacent waveform 1706 is calculated using a SFDFT, as given in block 906. As before, the waveform samples are taken between the first two tachometer pulses in the adjacent waveform 1706. The rate of change in phase is then estimated as given in block 908, using $$\Delta\phi_w = \phi_w/t_w$$

where $t_w$ is the time between the two tachometer pulses. The average rate of change in phase for the waveform in the gap 1702 is then calculated as given in block 910, using $$\Delta\phi_g = (\Delta\phi_r + \Delta\phi w)/2.$$

E. Creation of a Linear Waveform in the Gap

Figure 10A:
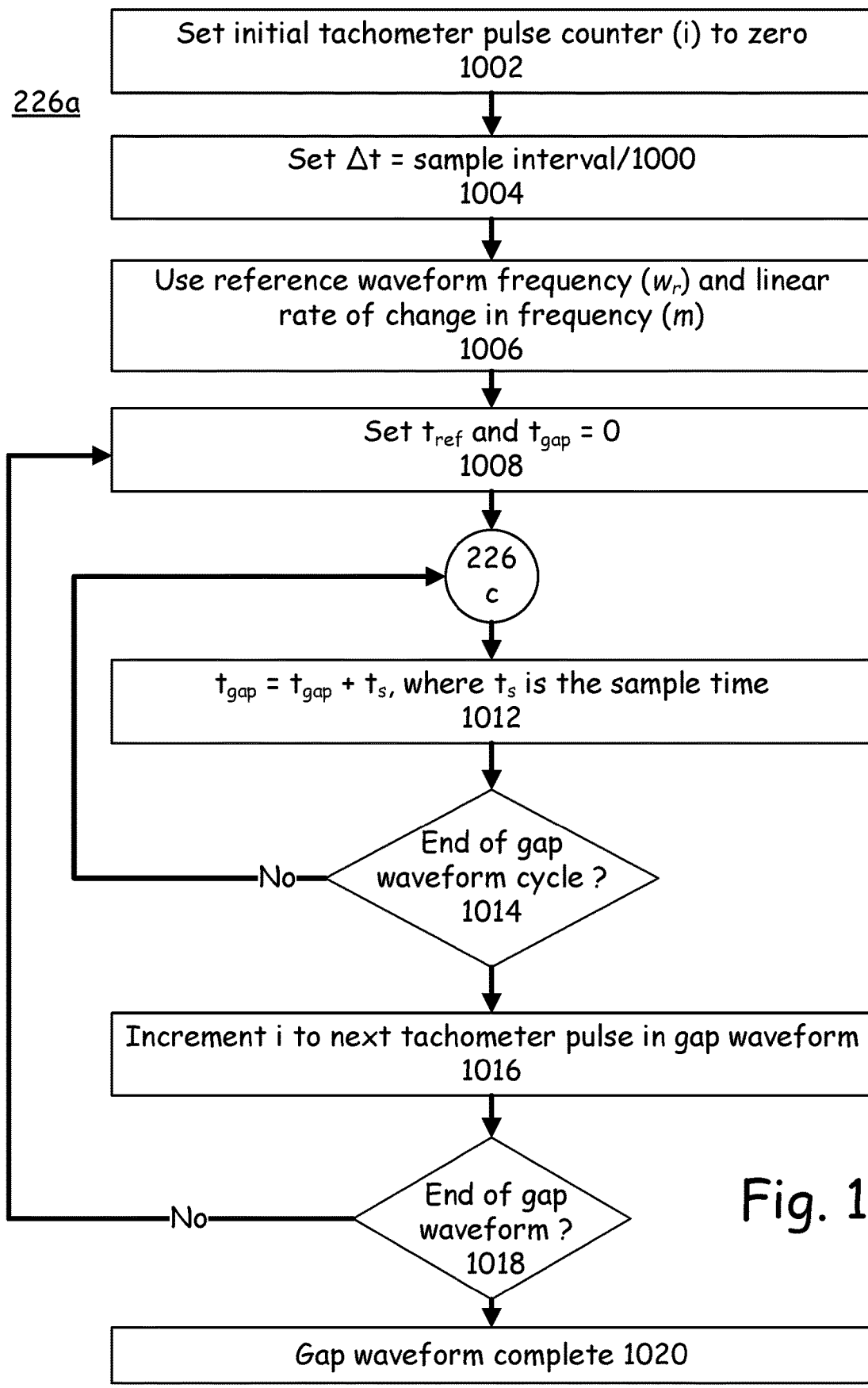
FIG. 10A is a flowchart of a sixth part of a detailed method for estimating waveforms for linear speed increases, according to an embodiment of the present invention.
Figure 10B:
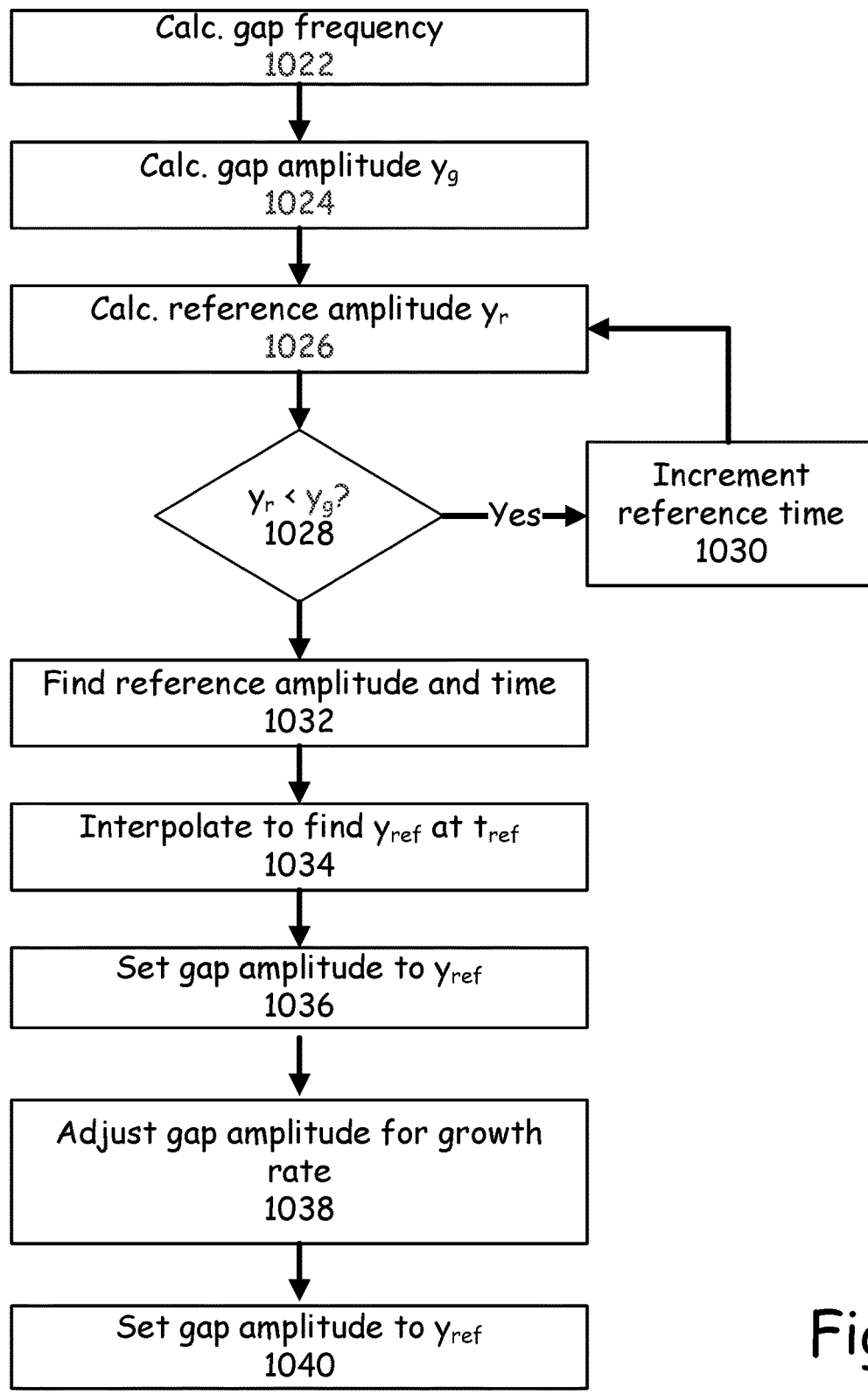
FIG. 10B is a flowchart of a seventh part of a detailed method for estimating waveforms for linear speed increases, according to an embodiment of the present invention.

The basic concept is to compress the last tachometer cycle of the reference waveform 1704 into the tachometer cycles in the gap 1702 waveform, as given in methods 226a and 226c of FIGS. 10A and 10B, where $t_{ref}$ represents the time interval in the reference waveform 1704 and $t_{gap}$ represents the time interval in the waveform gap 1702.

The waveform in the gap 1702 is then interpolated as described above in regard to FIG. 4 and method 226a as given in FIG. 10A.

The amplitude of the wave is then adjusted for changes in amplitude and phase as given in flowcharts 222a and 224a. This process is repeated until the entire gap 1702 is filled.

This process is described in more detail with reference to methods 226a and 226b, as depicted in FIGS. 10A and 10B, respectively. First, the process variables are initialized, as started in block 1002, where the initial tach pulse counter is set to zero, and then an incremental value Δt is set as some small number, such as the sample interval divided by 1,000, as given in block 1004. The frequency $w_r$ and linear rate of change in frequency m for the reference waveform 1704 are initially used in the calculations, as given in block 1006. Finally, $t_{ref}$ and $t_{gap}$ are initialized to values of zero, as given in block 1008.

The method then falls to a loop through method 226c, as depicted in FIG. 10B, where the gap frequency is calculated as given in block 1022, the gap amplitude is calculated as given in block 1024, and the reference amplitude is calculated, as given in block 1026. If the amplitude of the reference block 1704 is less than the amplitude of the gap 1702 as determined in block 1028, then the reference time as used in the calculations is incremented as given in block 1030, and the reference amplitude is recalculated as in block 1026. If the reference amplitude is not less than the gap amplitude, then the reference amplitude and time are found as given in block 1032, and $y_{ref}$ is found at $t_{ref}$ through interpolation, as given in block 1034. The gap 1702 amplitude is set to that value of $y_{ref}$ as given in block 1036, and the gap 1702 amplitude is adjusted for growth as given in block 1038. Finally, the gap 1702 amplitude is set to $y_{ref}$ as given in block 1040, and the method falls back to method 226a as depicted in FIG. 10A.

After returning to the method 226a, $t_{gap}$ is incremented by the sample time, as given in block 1012, and it is determined whether the cycle of the currently reconstructed waveform is completed, as given in block 1014. If the cycle of the current waveform is not completed, then the method returns to method 226c. If the waveform cycle has been completed (one complete period), then the method falls to block 1016, where the value of i is incremented to the next tach pulse in the gap 1702 waveform, for the possible creation of another waveform cycle by returning to block 1008. However, if the last waveform was the final waveform to be placed into the gap 1702, as tested in block 1018, then the waveform reconstruction process is finished, as given in block 1020.

In some embodiments, the change in rotational speed across the gap 1702 should not be more than about a factor of ten, as greater changes in rotational speed in some embodiments tends to reduce the number of waveform cycle samples to such an extent that detailed changes in the waveform are lost.

In some embodiments, the change in rotational speed between the two waveform cycles on either side of the gap 1702 is assumed to be linear. This is not normally an issue, as typically the change in rotational speed across the gap 1702 involves a large number of waveform cycles.

Numerical Solution for Exponential Section
A. Exponential Frequency and Speed

Figure 11:
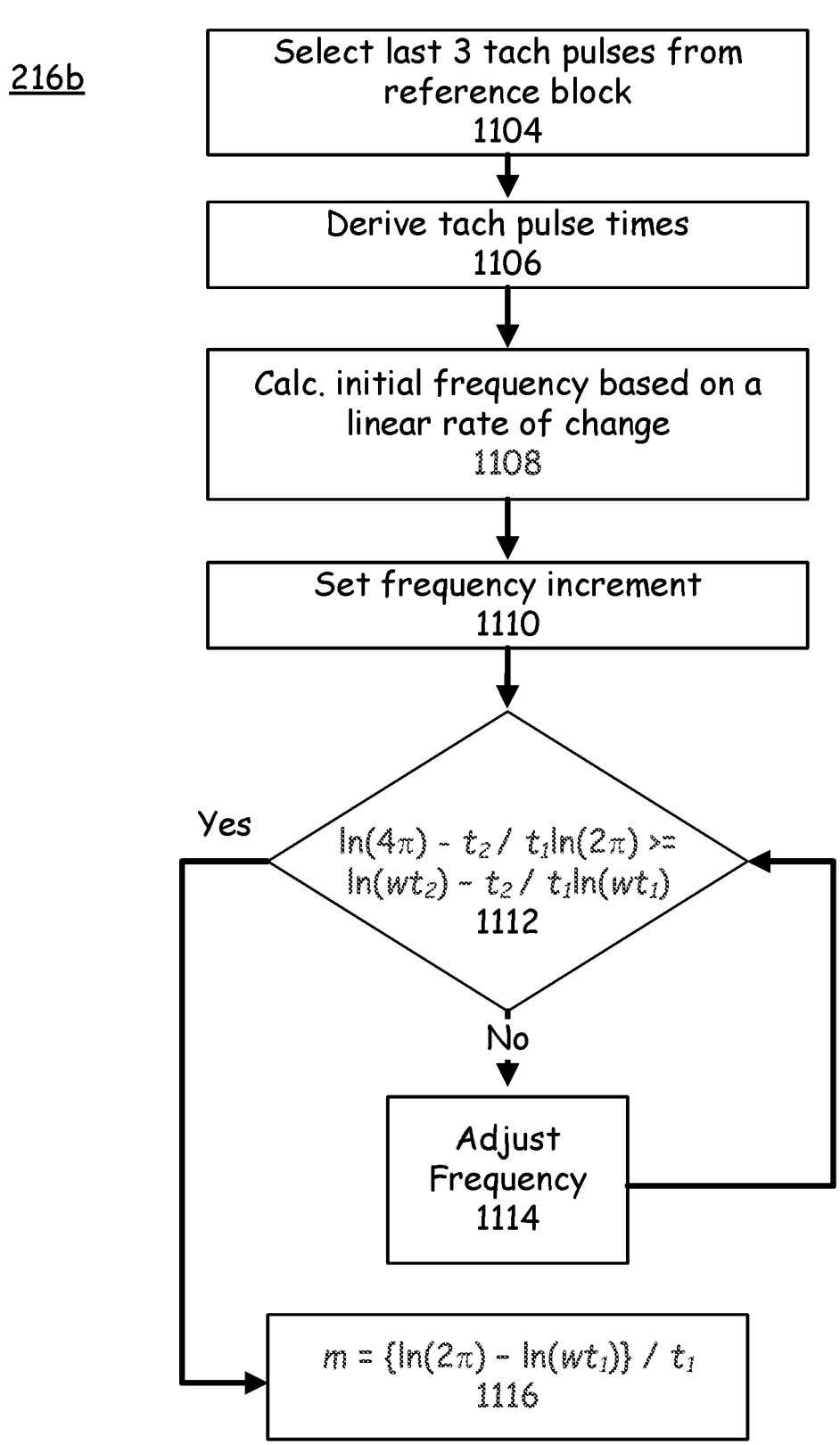
FIG. 11 is a flowchart of a first part of a detailed method for estimating waveforms for exponential speed decay, according to an embodiment of the present invention.

The process in this case is similar to the linear case, however, unlike the linear case that had an analytical solution to find the frequency and rate of change in rotational speed, the exponential change in rotational speed case requires a numerical iteration process to find the frequency and change in rotational speed, as depicted in method 216b of FIG. 11.

As before, the last three tach pulses are taken from the reference block 1704, as given in block 1104. However, in this case, the reference block 1704 is, in some embodiments, the first waveform block following the gap 1702, as it contains a waveform with a lower turning speed than the block 1706 preceding the gap 1702, because the rotating machine is slowing down.

The tach pulse times are derived from the identified tach pulses, as given in block 1106, and an initial frequency is calculated, as given in block 1108, based on a linear rate of change. However, the frequency does not change linearly in this section, as previously discussed, so this calculated frequency is only a starting point for the following calculations. A small incremental value for adjusting this initial frequency is selected, as given in block 1110, and the iterative process of bocks 1112 and 1114 are commenced.

The initial estimation of frequency uses the previously defined linear equation $$w=2\pi(1-2t_1^2/t_2^2)/t_1(1-/t_2)$$

With an exponential increase in frequency, the amplitude (y) is given by $$y=\sin(wte^{mt})$$

$$\sin(wte^{mt})=0 \text{ when}$$

$$wte^{mt}=2\pi, 4\pi, \text{ etc.}$$

Taking the natural logarithm of each side of the equation gives $$\ln(wt_1)+mt_1=\ln(2\pi) \text{ and}$$

$$\ln(wt_2)+mt_2=\ln(4\pi)$$

Solving these two equations gives $$\ln(wt_2)-t_2/t_1 \ln(wt_1)=\ln(4\pi)-t_2/t_1 \ln(2\pi), \text{ and}$$

$$m=\{\ln(2\pi)-\ln(wt_1)\}/t_1$$

There is no analytical solution to the equation for w. Instead, w must be derived by a numerical iteration method of slowly increasing w from its initial value as set using the linear equation above, until the equation is satisfied as depicted in block 1112 of flow chart 216b of FIG. 11. If it is not satisfied, then the calculated frequency is adjusted as given in block 1114, using the incremental amount set in block 1110. Once w is derived, then the exponential change in rotation speed m is calculated, as given in block 1116.

Figure 12:
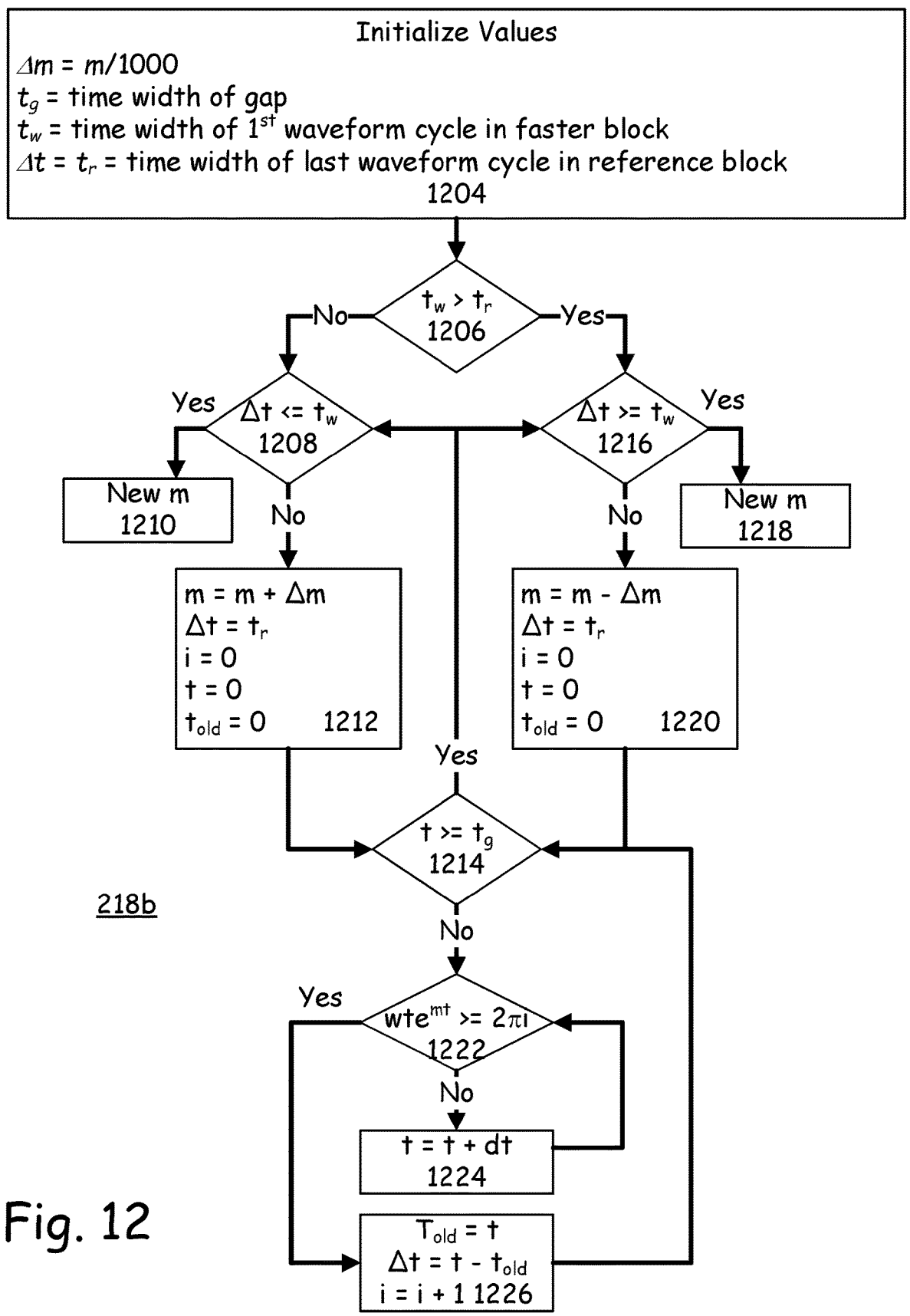
FIG. 12 is a flowchart of a second part of a detailed method for estimating waveforms for exponential speed decay, according to an embodiment of the present invention.

As before, the rate of change of m may not be the same as for the adjacent waveform 1706 across the gap 1702, and therefore may need to be adjusted as depicted in flowchart 218b of FIG. 12. The process is to iteratively adjust the rate of change in rotational speed (m) until the final tachometer pulse width in the gap 1702 matches the first pulse width ($t_w$) of the adjacent waveform 1706. The starting rotational speed m is estimated as shown in FIG. 11, and is either increased or decreased depending on the relative tachometer pulse width $t_w$ and $t_r$ as shown in FIG. 12. The gap 1702 is then filled with tachometer pulses, and the final pulse width in the gap 1702 Δt is compared to $t_w$. This process is repeated iteratively until they match.

Using the equation for a linear change in rotational speed $$y=\sin(wt^{emt})$$

The equation for the pulse times in the gap 1702 is given by $$\sin(wt^{emt})=0 \text{ when}$$

$$wt^{emt}=2\pi i$$

where (i) is the $i^{th}$ tachometer pulse.

This equation is solved iteratively by slowly increasing t until $$wt^{emt}>=2\pi i$$

In regard to FIG. 12, method 218b starts in block 1204 by determining and setting the variables that will be used in the method 218b. For example, the time width $t_g$ of the gap 1702 is determined, as well as the time widths of the first tach pulse $t_w$ in the adjacent block 1706 and the last tach pulse $t_r$ in the reference block 1704. A value is selected for an incremental amount Δm by which the speed m will be iteratively adjusted so as to make the tach pulses in the gap 1702 line up with the tach pulses in the adjacent block 1706. A variable Δt is initialized at the value of $t_r$.

The time width between the two tach pulses that are closest to the gap 1702 in the reference block 1704 and the two tach pulses that are closest to the gap 1702 in the adjacent block 1706, $t_r$ and $t_w$ respectively, are compared to see which is greater, as given in block 1206. If $t_r$ is less than $t_w$, then the right-hand side of the method 218b as depicted in FIG. 12 is implemented in block 1216. If $t_r$ is greater than $t_w$, then the left-hand side of the method 218b as depicted in FIG. 12 is implemented in block 1208.

In blocks 1208 and 1216, $t_w$ is compared to Δt. In block 1208, if Δt is not greater than $t_w$, then the method 218b exits with the new speed m as previously determined. Similarly, in block 1216, if Δt is greater than or equal to $t_w$, then the method 218b exits with the new speed m as previously determined. However, if in either case the answer to the test of 1208 or 1216 is no, then the method falls respectively to block 1212 or 1220, where variables are initialized for a loop where m is adjusted until the criteria as described herein have been met. In block 1212, m is too small, and so m is adjusted upwards by the value of Δm. In block 1220, m is too large, and so m is adjusted downwards by the value of Δm.

The time t is then tested against the gap time $t_g$, as given in block 1214. If the test fails, then t is tested in a different manner, as indicated in block 1222, and as described above. If that value of t does not meet the secondary criteria, which in some embodiments it would not on the first pass, then t is adjusted as given in block 1224, and the criteria of block 1222 are again tested. When t eventually meets the criteria of block 1222, then the values of the variables are set as given in block 1226, and the new t is again tested against the gap time $t_g$. When the newt eventually satisfies the condition in block 1214, the method 218b returns to the blocks 1208 and 1216, where the iterations continue until the speed m is found that allows the tach signals to align.

B. Exponential Tach Pulses

Once the rate of change in rotational speed m has been adjusted, the next step is to create the tachometer pulses in the waveform gap 1702. Using the equation for an exponential change in rotational speed, shown above, the time for each tachometer pulse $t_i$ is given by $$wt_i e^{mti} = 2\pi i$$

There is no analytical solution to this equation for $t_i$. In this case, $t_i$ is derived by a numerical iteration method of slowly increasing $t_i$ from a small initial value until the equation is satisfied as shown in flow chart 220b of FIG. 13.

Figure 13:
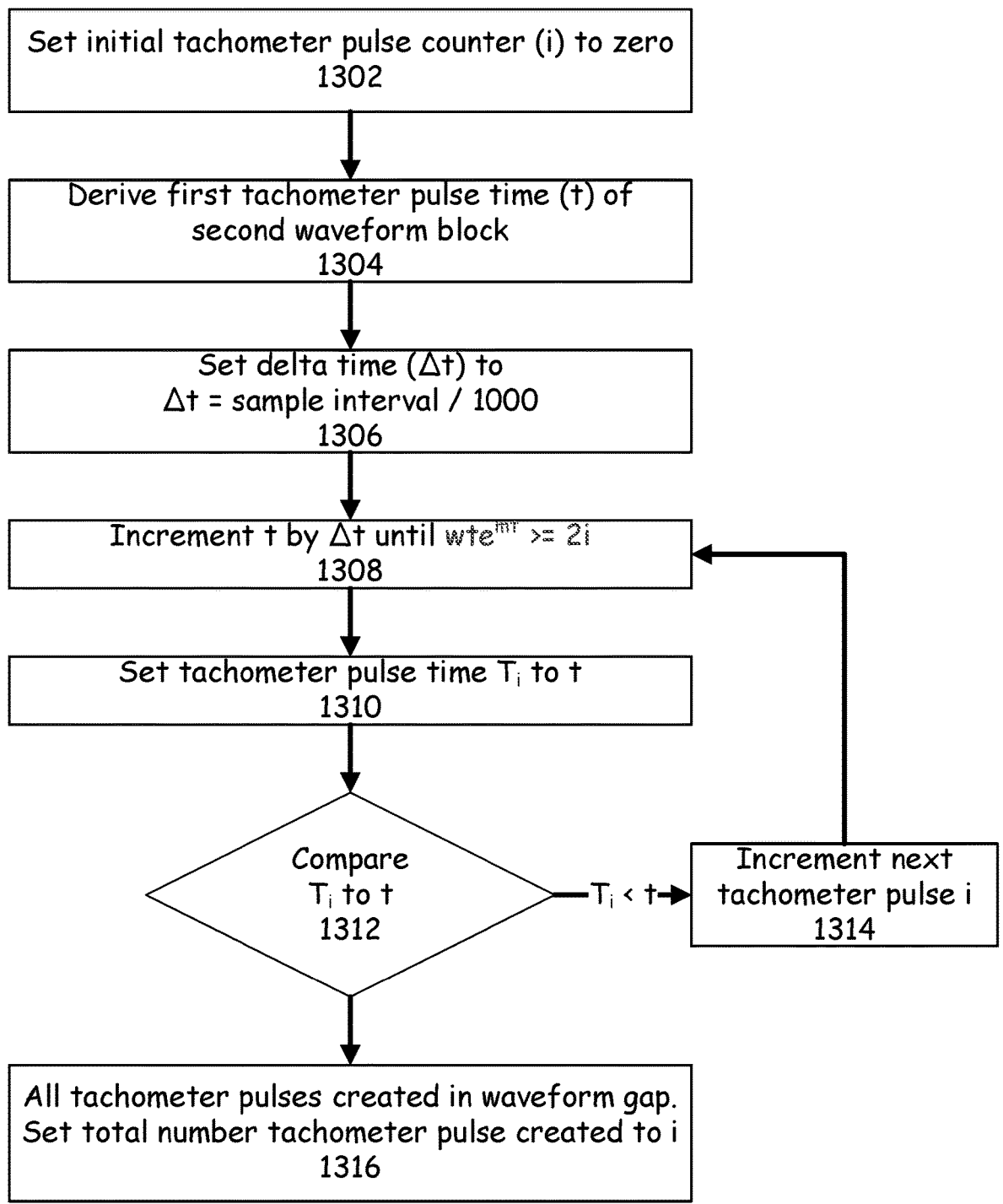
FIG. 13 is a flowchart of a third part of a detailed method for estimating waveforms for exponential speed decay, according to an embodiment of the present invention.

This is depicted as method 220b in FIG. 13. The initial tach pulse counter i is set to zero, as given in block 1302. The time t of the first tach pulse of the reference block 1704 is derived, as given in block 1304 and above, and an incremental time Δt is set based on the sample interval, as given in block 1306. The time t is then incremented by Δt until the condition specified in block 1308 is satisfied, and then the tachometer pulse time $T_i$ is set to t, as indicated in block 1310. The value of $T_i$ is compared to t, as given in block 1312. If $T_i$ is less than t, then there is room for another tach pulse, so the tach pulse number i is incremented as given in block 1314, and the process returns to block 1308 to calculate the next tach pulse time $T_i$. However, if $T_i$ is not less than t, then all of the tach pulses have been created, and the method falls to block 13162, and the total number of tach pulses created is the current value of i.

C. Exponential Amplitude

Figure 14:
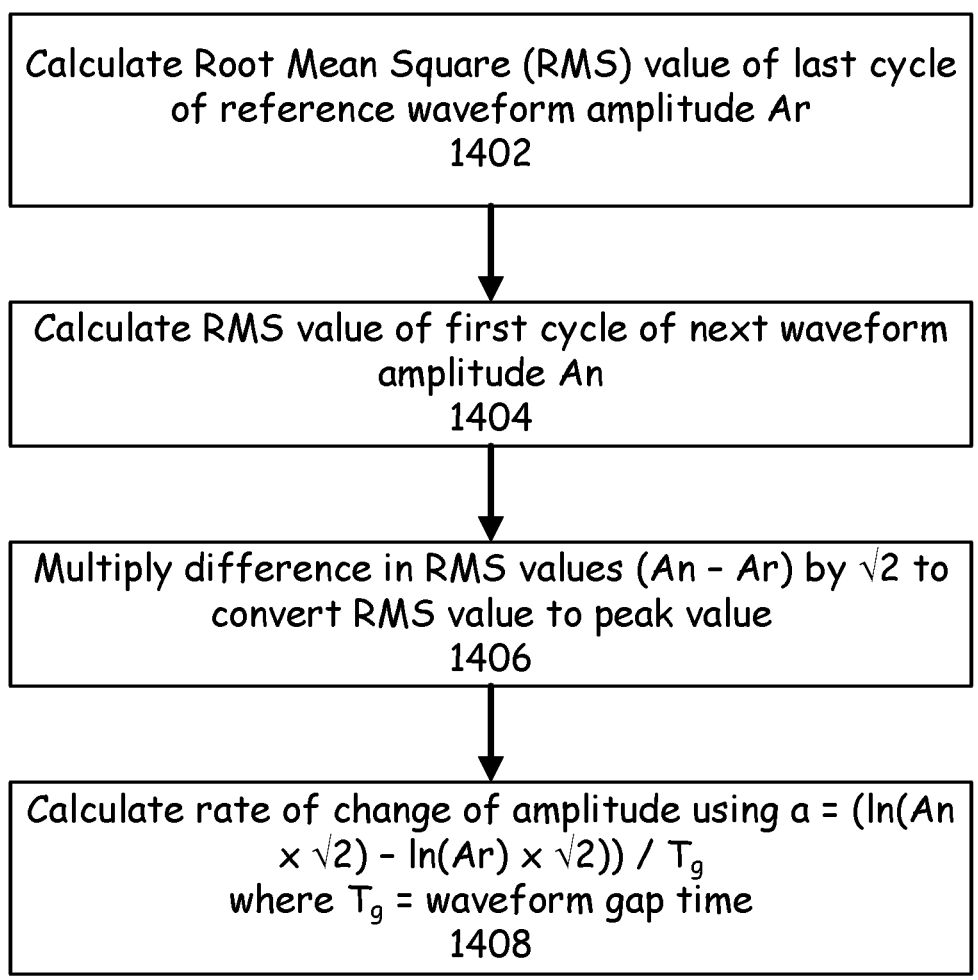
FIG. 14 is a flowchart of a fourth part of a detailed method for estimating waveforms for exponential speed decay, according to an embodiment of the present invention.

In this case, the exponential increase in amplitude (y) is given by $$y = e^{at} \times \sin(wte^{mt})$$

where a is the exponential rate of change in waveform amplitude, and t is time in seconds This is graphically illustrated in flowchart 222b of FIG. 14. In block 1402, the Root Mean Square (RMS) value (Ar) of the last cycle of the reference waveform 1704 is calculated. Then, the RMS value (An) of the first cycle of the adjacent waveform 1706 is calculated, as given in block 1404. The RMS values are converted to peak values by multiplying by √2, as given in block 1406. Finally, the linear rate of change in the waveform amplitude (a) is computed as depicted in block 1408, by using:

$$a = (\ln(An*\sqrt{2}) - \ln(Ar*\sqrt{2})/T_g$$

where $T_g$ is the time between the waveforms (i.e. the waveform gap time).

D. Exponential Phase

The linear change in phase Δφ is given by:

$$y = \sin(wte^{mt} + e^{\Delta\phi t}),$$

where

Δφ is the linear rate of change in waveform phase, and t is the time in seconds.

Figure 15:
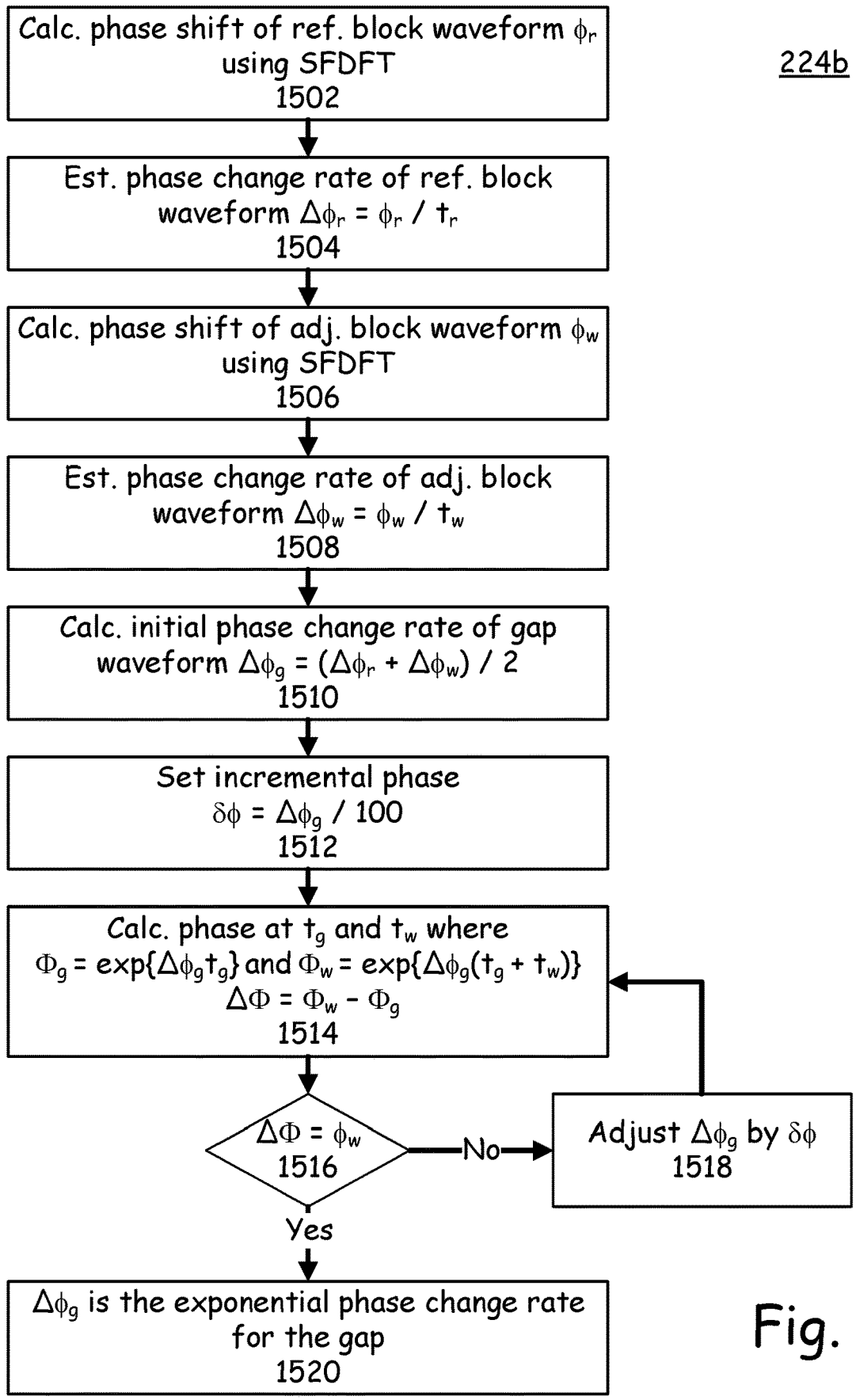
FIG. 15 is a flowchart of a fifth part of a detailed method for estimating waveforms for exponential speed decay, according to an embodiment of the present invention.

With reference now to the method 224b as depicted in FIG. 15, the first step as given in block 1502 is to calculate the change in phase $\phi_r$ of the waveform cycle that is closest to the gap 1702 in the reference block 1704, using a Single Frequency Discrete Fourier Transform (SFDFT). These waveform samples are taken between the last two tachometer pulses in the reference block waveform. The rate of change in phase is then estimated as given in block 1504 by using:

$$\Delta\phi_r = \phi_r/t_r$$

where $t_r$ is the time between the two tachometer pulses.

As given in block 1506, the next step is to calculate the change in phase $\phi_w$ of the first cycle of the adjacent waveform 1706 using a SFDFT. The waveform samples are taken between the two tachometer pulses in the adjacent waveform 1706 that are closest to the gap 1702. The rate of change in phase is then estimated as given in block 1508 by using:

$$\Delta\phi_w = \phi_w/t_w$$

where $t_w$ is the time between the two tachometer pulses.

For an exponential change in phase, the average rate of change in phase for the waveform in the gap 1702 is then calculated as given in block 1510, by using:

$$\Delta\phi_g = (\Delta\phi_r + \Delta\phi_w)/2$$

A small incremental phase adjustment δφ is set, as given in block 1512. This is the amount by which the phase will be iteratively adjusted in subsequent steps, according to the numerical method. Then, as given in block 1514, the phase $\Phi_g$ is calculated at $t_g$ and $t_w$, from which ΔΦ is calculated. ΔΦ is then tested against $\phi_w$, as given in block 1516. If ΔΦ does not equal $\phi_w$, then $\Delta\phi_g$ is adjusted by δφ, as given in block 1518, and the iteration returns to block 1514. However, if ΔΦ does equal ϕ$_w$, then that current value of Δϕ$_g$ is taken as the exponential phase change rate for the gap 1702, as given in block 1520.

E. Creation of an Exponential Waveform in the Gap

Figure 16A:
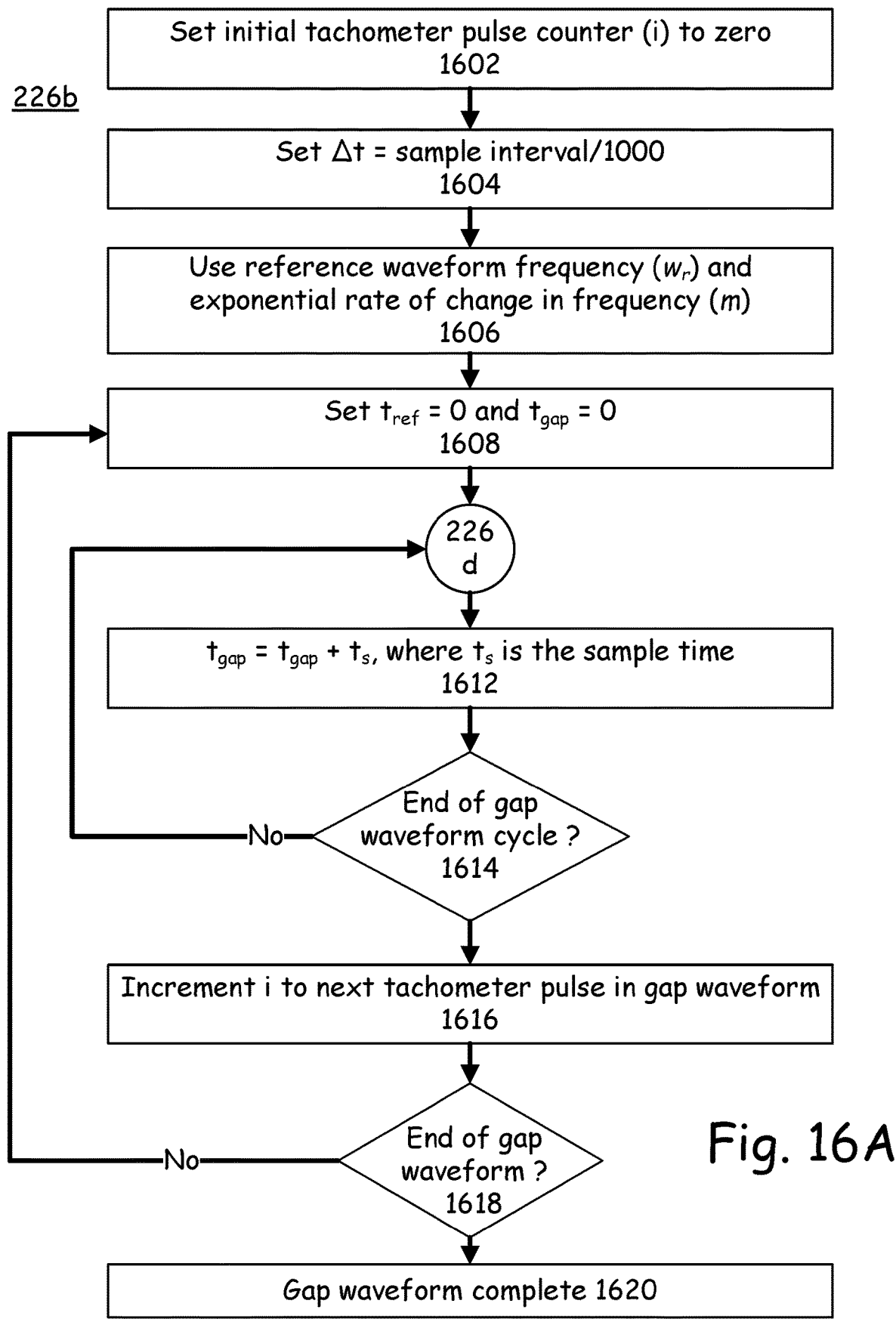
FIG. 16A is a flowchart of a sixth part of a detailed method for estimating waveforms for exponential speed decay, according to an embodiment of the present invention.
Figure 16B:
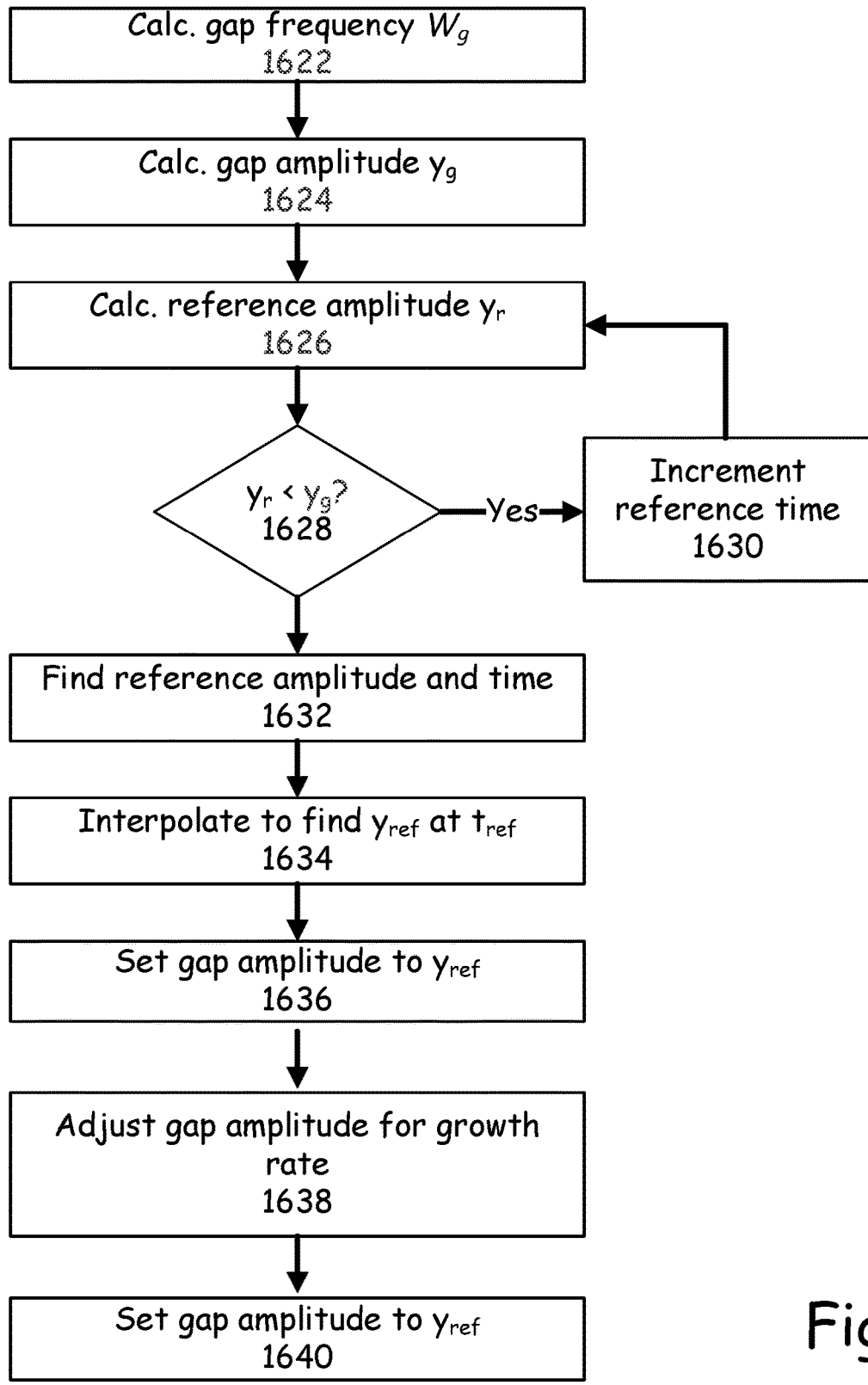
FIG. 16B is a flowchart of a seventh part of a detailed method for estimating waveforms for exponential speed decay, according to an embodiment of the present invention.

The basic concept is to compress the nearest tachometer cycle of the reference waveform 1704 into the tachometer cycles in the gap 1702 waveform, as given in methods 226*b* and 226*d* of FIGS. 16A and 16B, where t$_{ref}$ represents the time interval in the reference waveform 1704 and t$_{gap}$ represents the time interval in the waveform gap 1702.

The waveform in the gap 1702 is then interpolated as described above in regard to FIG. 4 and method 226*b* as given in FIG. 16A.

The amplitude of the wave is then adjusted for changes in amplitude and phase as given in flowcharts 222*b* and 224*b*. This process is repeated until the entire gap 1702 is filled.

This process is described in more detail with reference to methods 226*b* and 226*d*, as depicted in FIGS. 16A and 16B, respectively. First, the process variables are initialized, as started in block 1602, where the initial tach pulse counter is set to zero, and then an incremental value Δt is set as some small number, such as the sample interval divided by 1,000, as given in block 1604. The frequency w$_r$ and linear rate of change in frequency m for the reference waveform 1704 are initially used in the calculations, as given in block 1606. Finally, t$_{ref}$ and t$_{gap}$ are initialized to values of zero, as given in block 1608.

The method then falls to a loop through method 226*d*, as depicted in FIG. 16B, where the gap frequency is calculated as given in block 1622, the gap amplitude is calculated as given in block 1624, and the reference amplitude is calculated, as given in block 1626. If the amplitude of the reference block 1704 is less than the amplitude of the gap 1702 as determined in block 1628, then the reference time as used in the calculations is incremented as given in block 1630, and the reference amplitude is recalculated as in block 1626. If the reference amplitude is not less than the gap amplitude, then the reference amplitude and time are found as given in block 1632, and y$_{ref}$ is found at t$_{ref}$ through interpolation, as given in block 1634. The gap 1702 amplitude is set to that value of y$_{ref}$ as given in block 1636, and the gap 1702 amplitude is adjusted for growth as given in block 1638. Finally, the gap 1702 amplitude is set to y$_{ref}$ as given in block 1640, and the method falls back to method 226*b* as depicted in FIG. 16A.

After returning to the method 226*b*, t$_{gap}$ is incremented by the sample time, as given in block 1612, and it is determined whether the cycle of the currently reconstructed waveform is completed, as given in block 1614. If the cycle of the current waveform is not completed, then the method returns to method 226*d*. If the waveform cycle has been completed (one complete period), then the method falls to block 1616, where the value of i is incremented to the next tach pulse in the gap 1702 waveform, for the possible creation of another waveform cycle by returning to block 1608. However, if the last waveform was the final waveform to be placed into the gap 1702, as tested in block 1618, then the waveform reconstruction process is finished, as given in block 1620.

In some embodiments, the change in rotational speed across the gap 1702 should not be more than about a factor of ten, as greater changes in rotational speed in some embodiments tends to reduce the number of waveform cycle samples to such an extent that detailed changes in the waveform are lost.

In some embodiments, the change in rotational speed between the two waveform cycles on either side of the gap 1702 is assumed to be exponential. This is not normally an issue, as typically the change in rotational speed across the gap 1702 involves a large number of waveform cycles.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for filling a gap of missing vibration data in a set of vibration data, the method comprising the steps of:
   sensing vibration data from a rotating machine with a sensor,
   creating the set of vibration data from the vibration data,
   reading the set of vibration data with a computer,
   selecting, with the computer, at least one reference waveform on a first side of the gap and at least one adjacent waveform on an opposing second side of the gap,
   determining, with the computer, whether the gap is in a section of the vibration data where a state of frequency of the vibration data is determined to be one of changing linearly, changing exponentially, and steady state,
   when the gap is in a section of the vibration data where the state of the frequency of the vibration data is changing linearly, applying, with the computer, an analytical method to at least one of the at least one reference waveform and the at least one adjacent waveform to approximate the vibration data that is missing in the gap,
   when the gap is in a section of the vibration data where the state of the frequency of the vibration data is changing exponentially, applying, with the computer, a numerical method to at least one of the at least one reference waveform and the at least one adjacent waveform to approximate the vibration data that is missing in the gap,
   when the gap is in a section of the vibration data where the state of the frequency of the vibration data is steady state, copying, with the computer, at least one of the at least one reference waveform and the at least one adjacent waveform to approximate the vibration data that is missing in the gap, and
   presenting, with a display, the approximated vibration data with the gap filled as a plot to a user.

2. The method of claim 1, wherein when the gap is in a section of the vibration data where the state of the frequency of the vibration data is changing, the at least one reference waveform has a frequency that is slower than the at least one adjacent waveform.

3. The method of claim 1, wherein the set of vibration data is sensed from a turbine.

4. The method of claim 3, wherein the state of the frequency of the vibration data is changing linearly as a rotating speed of the turbine is increased to an operating speed.

5. The method of claim 3, wherein the state of the frequency of the vibration data is changing exponentially as a rotating speed of the turbine is decreased from an operating speed.

6. The method of claim 3, wherein the state of the frequency of the vibration data is steady state as the turbine is running at an operating speed.

7. The method of claim 1, wherein the step of approximating the data using either the numerical method or the analytical method further comprises:
   approximating a frequency rate of change of the missing vibration data in the gap,
   approximating tach signal locations of the missing vibration data in the gap,
   approximating an amplitude rate of change of the missing vibration data in the gap,
   approximating a phase rate of change of the missing vibration data in the gap,
   filling the gap with ideal waveforms between the tach signal locations, and
   adjusting the ideal waveforms using the approximated frequency, amplitude, and phase rates of change.

8. A method for filling a gap of missing vibration data in a set of vibration data, the method comprising the steps of:
   sensing vibration data from a rotating machine with a sensor,
   creating the set of vibration data from the vibration data,
   reading the set of vibration data with a computer,
   selecting, with the computer, at least one reference waveform on a first side of the gap and at least one adjacent waveform on an opposing second side of the gap,
   determining, with the computer, whether the gap is in a section of the vibration data where a state of frequency of the vibration data is determined to be one of changing linearly, changing exponentially, and steady state,
   when the gap is in a section of the vibration data where the state of the frequency of the vibration data is changing linearly, applying, with the computer, an analytical method to at least one of the at least one reference waveform and the at least one adjacent waveform to approximate the vibration data that is missing in the gap,
   when the gap is in a section of the vibration data where the state of the frequency of the vibration data is changing exponentially, applying, with the computer, a numerical method to at least one of the at least one reference waveform and the at least one adjacent waveform to approximate the vibration data that is missing in the gap,
   when the gap is in a section of the vibration data where the state of the frequency of the vibration data is steady state, copying, with the computer, at least one of the at least one reference waveform and the at least one adjacent waveform to approximate the vibration data that is missing in the gap,
   wherein the step of approximating the data using either the numerical method or the analytical method further comprises,
     approximating, with the computer, a frequency rate of change of the missing vibration data in the gap,
     approximating, with the computer, tach signal locations of the missing vibration data in the gap,
     approximating, with the computer, an amplitude rate of change of the missing vibration data in the gap,
     approximating, with the computer, a phase rate of change of the missing vibration data in the gap, and
     filling, with the computer, the gap with ideal waveforms between the tach signal locations, and
     adjusting, with the computer, the ideal waveforms using the approximated frequency, amplitude, and phase rates of change, and
   presenting, with a display, the approximated vibration data with the gap filled as a plot to a user.

9. The method of claim 8, wherein when the gap is in a section of the vibration data where the state of the frequency of the vibration data is changing, the at least one reference waveform has a frequency that is slower than the at least one adjacent waveform.

10. The method of claim 8, wherein the set of vibration data is sensed from a turbine.

11. The method of claim 10, wherein the state of the frequency of the vibration data is changing linearly as a rotating speed of the turbine is increased to an operating speed.

12. The method of claim 10, wherein the state of the frequency of the vibration data is changing exponentially as a rotating speed of the turbine is decreased from an operating speed.

13. The method of claim 10, wherein the state of the frequency of the vibration data is steady state as the turbine is running at an operating speed.

* * * * *